June 15, 1937.  W. H. LOLLEY ET AL  2,084,288
LIQUID DISPENSING
Filed Oct. 29, 1930  7 Sheets-Sheet 1

Inventors
WILLIAM H. LOLLEY
HARRY T. GOSS
By their Attorneys
Bohleber + Ledbetter

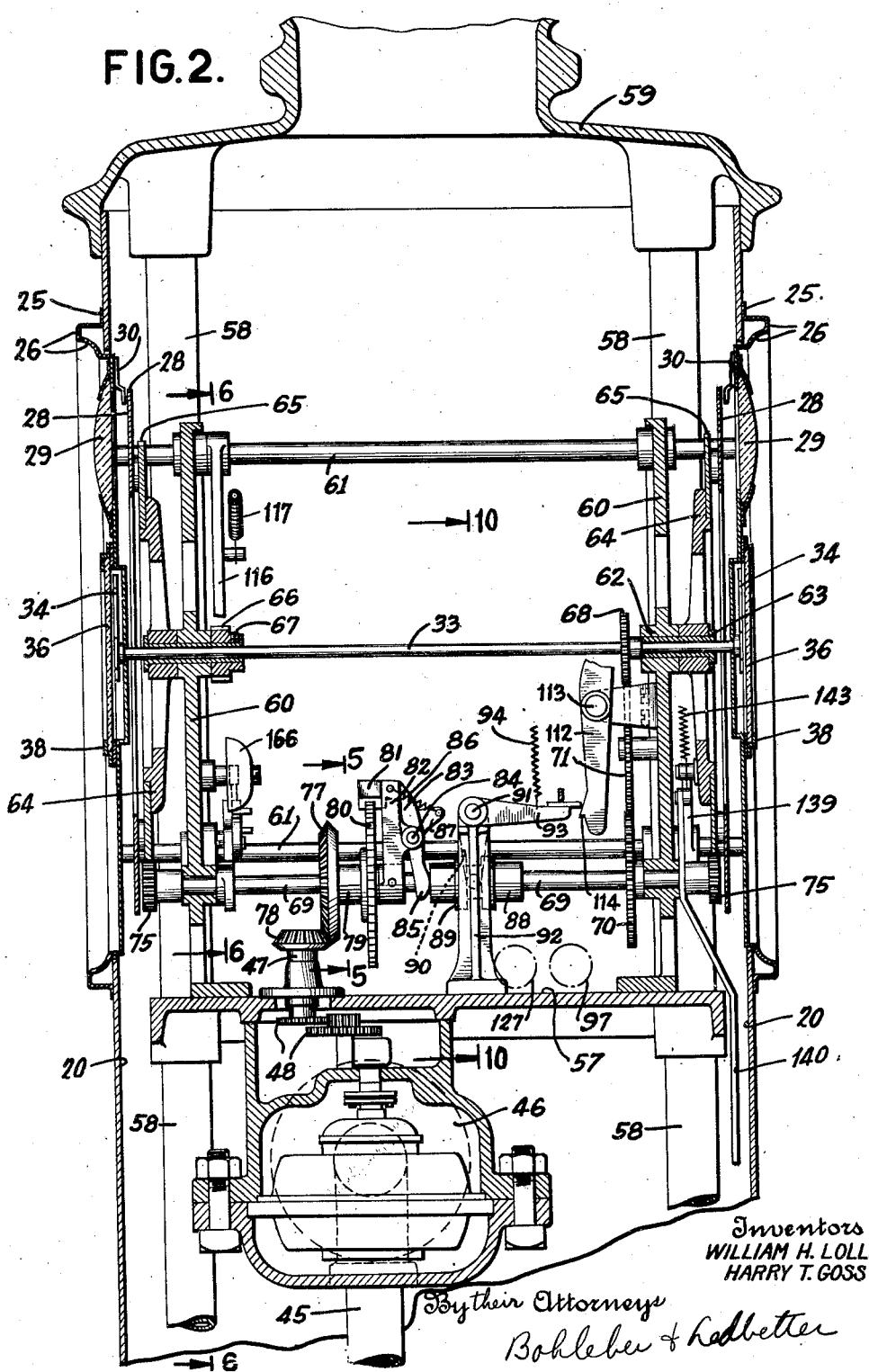

June 15, 1937.  W. H. LOLLEY ET AL  2,084,288
LIQUID DISPENSING
Filed Oct. 29, 1930  7 Sheets-Sheet 3

Inventors
WILLIAM H. LOLLEY
HARRY T. GOSS
By their Attorneys
Bohleber & Ledbetter Inventors
WILLIAM H. LOLLEY
HARRY T. GOSS
Attorneys
Bohleber & Ledbetter

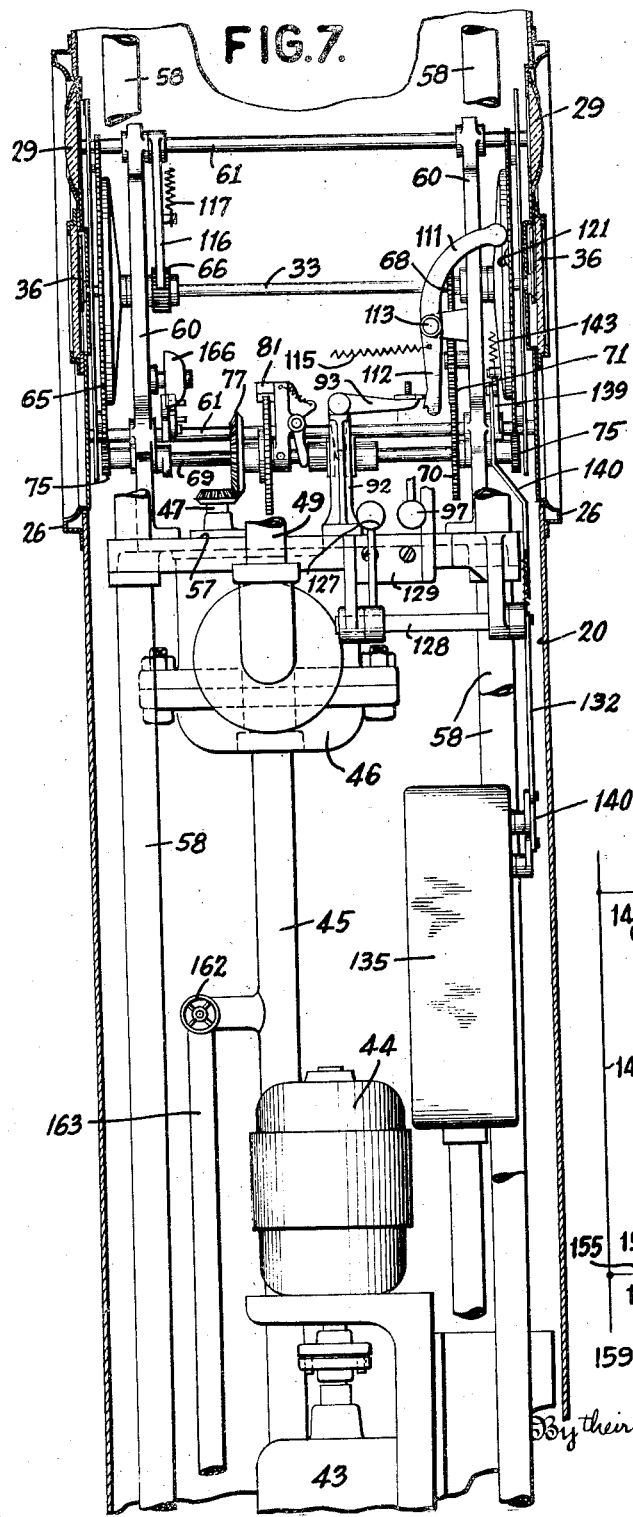
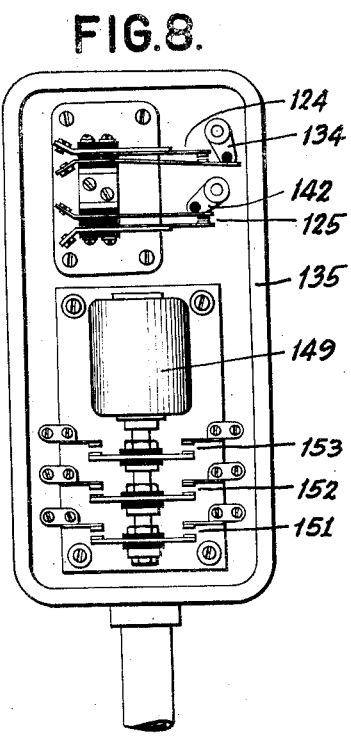
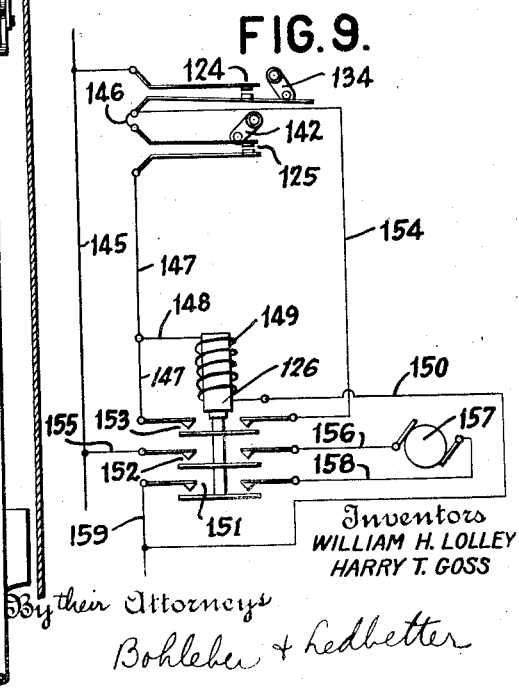

INVENTORS
WILLIAM H. LOLLEY
HARRY T. GOSS
BY ATTORNEYS

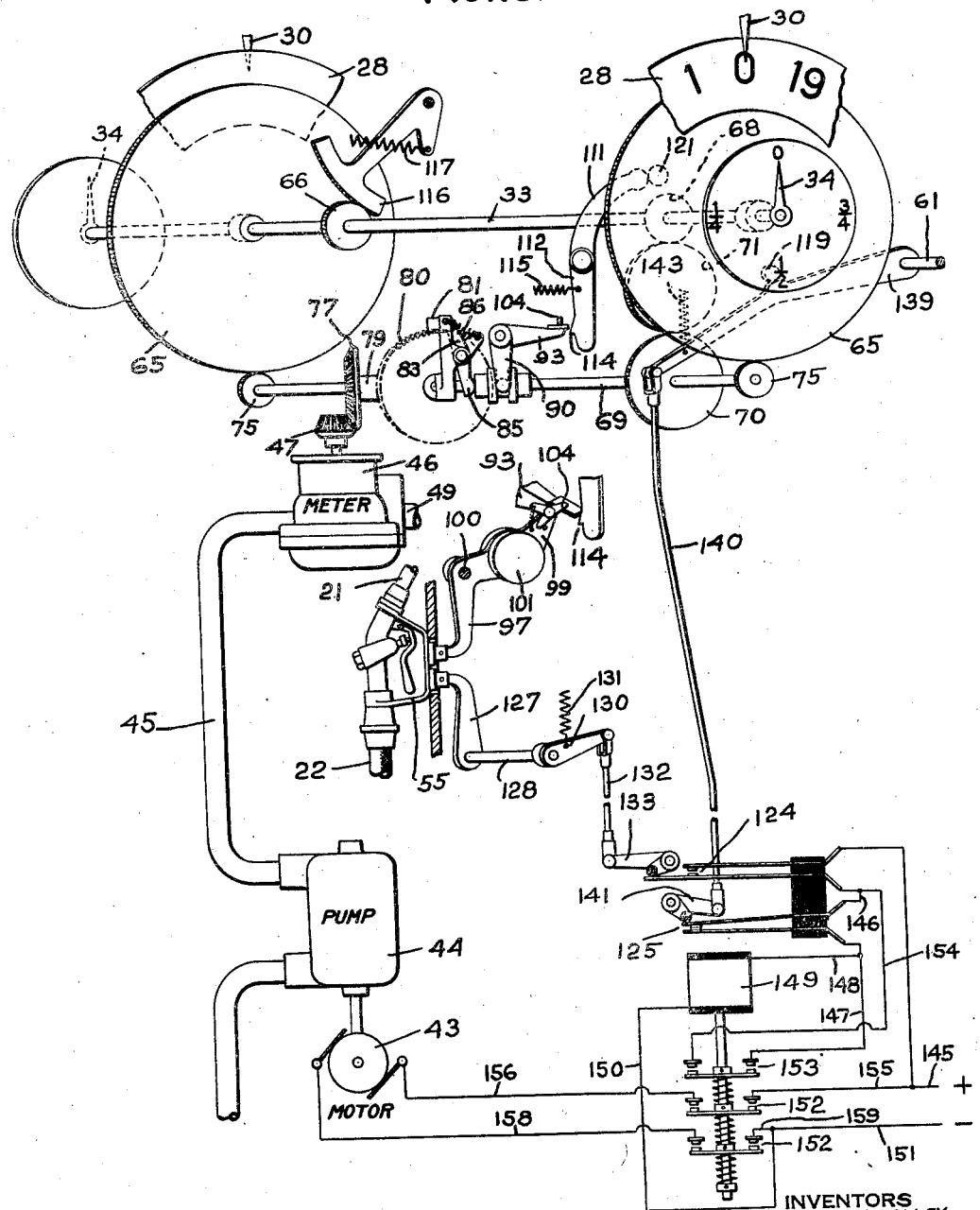

Patented June 15, 1937

2,084,288

UNITED STATES PATENT OFFICE 2,084,288

LIQUID DISPENSING

William H. Lolley, Albany, N. Y., and Harry T. Goss, Rutherford, N. J., assignors to L. N. S. Corporation, New York, N. Y., a corporation of Delaware Application October 29, 1930, Serial No. 491,907

170 Claims. (Cl. 221—95)

This invention relates broadly to fluid dispensing devices adapted to dispense gasoline and other liquid fuels at roadside service stations and the like, of the kind in which the pump is automatically actuated, as by a motor, whereby the delivery is continuous and the salesman, instead of operating a pump handle to serve the fluid may stand at the vehicle tank where he can see exactly how much the tank will hold and serve it without spilling.

In fluid meter pumps heretofore known, the volume of fluid delivered from the nozzle has been indicated by pointers travelling over a graduated dial, which pointers were manually returned to zero. The disadvantage of a dial with a manually reset pointer is that a dishonest salesman, by working quickly, can fail to return the pointer all the way to zero and so short measure the purchaser.

One object of the present invention is to provide indicating mechanism for a fluid meter pump in which the return to zero of the indicator is automatic.

Another object of the invention is to prevent tampering with the devices indicating the units of fluid delivered, when a sale is being made. To this end, the indicator returning devices are disposed within the housing so that access thereto cannot be had.

It is also an object to avoid confusion in reading the indication of the units of fluid delivered. Accordingly, indicating mechanism is provided wherein the only figure visible to the purchaser and salesman is the number of gallons actually delivered in that transaction.

It is a further object of the invention that the indication of the number of gallons purchased shall remain visible until the next transaction. In accordance with this aspect of the invention, clutch means are provided for disconnecting the indicating mechanism from the drive of the meter.

The invention also seeks the initiation of the operation of the device automatically upon removal of the nozzle from its support. To this end, the source of power and a clutch between the metering device and the registering mechanism is controlled by the nozzle when on its support and the operation of devices actuating the clutch is initiated by the removal of the nozzle from the support.

Yet another object of the invention is the control of the initiation of the actuation of the fluid delivery means by the nozzle. The source of power, for instance, the motor circuit, is rendered inoperative when the nozzle is on its support and rendered operable by devices released by the removal of the nozzle from its support.

Still another object of the invention is the automatic initiation of the operation of the fluid elevating means. Accordingly, the operation of the fluid elevating means is initiated by the return of the indicating means to initial position.

An important object of the invention is that the indicator displaying progressive indicia indicating the quantities of liquid dispensed in a given operation shall be prevented from displaying progressive indicia in a succeeding operation until the zero indicia has been displayed.

The invention further seeks a liquid dispensing system in which the flow of liquid in a dispensing operation is prevented when an indicator having a predetermined position and driven by a meter measuring the dispensed liquid is in other than initial position.

The invention also seeks fluid dispensing apparatus having restoring means for the indicating means and in which the fluid flow establishing means and the indicating means are interconnected whereby the flow establishing means is only operable upon actuation of the restoration means in restoring the indicating means to an initial position.

These and other objects of the invention and the means for their attainment will be more apparent from the following detailed description, taken in connection with the accompanying drawings illustrating one embodiment by which the invention may be realized, and in which:—

Figure 2 is a sectional view taken in the vertical plane indicated by the line 2—2 of Figure 1, looking in the direction of the arrows, and showing the mechanism within the fluid dispensing device.

Figure 7 is a view showing, in side elevation, the structure shown in Figure 6, looking from the right in that figure.

Figure 8 is a detail view of the control box with the cover removed and showing the electrical contacts by which the pump circuit is controlled.

Figure 9 is a diagrammatic view showing the circuits and contacts of the control box.

Figure 13 is a diagrammatic view, somewhat in perspective, showing the elements of the invention in their operative relation.

Figure 1:
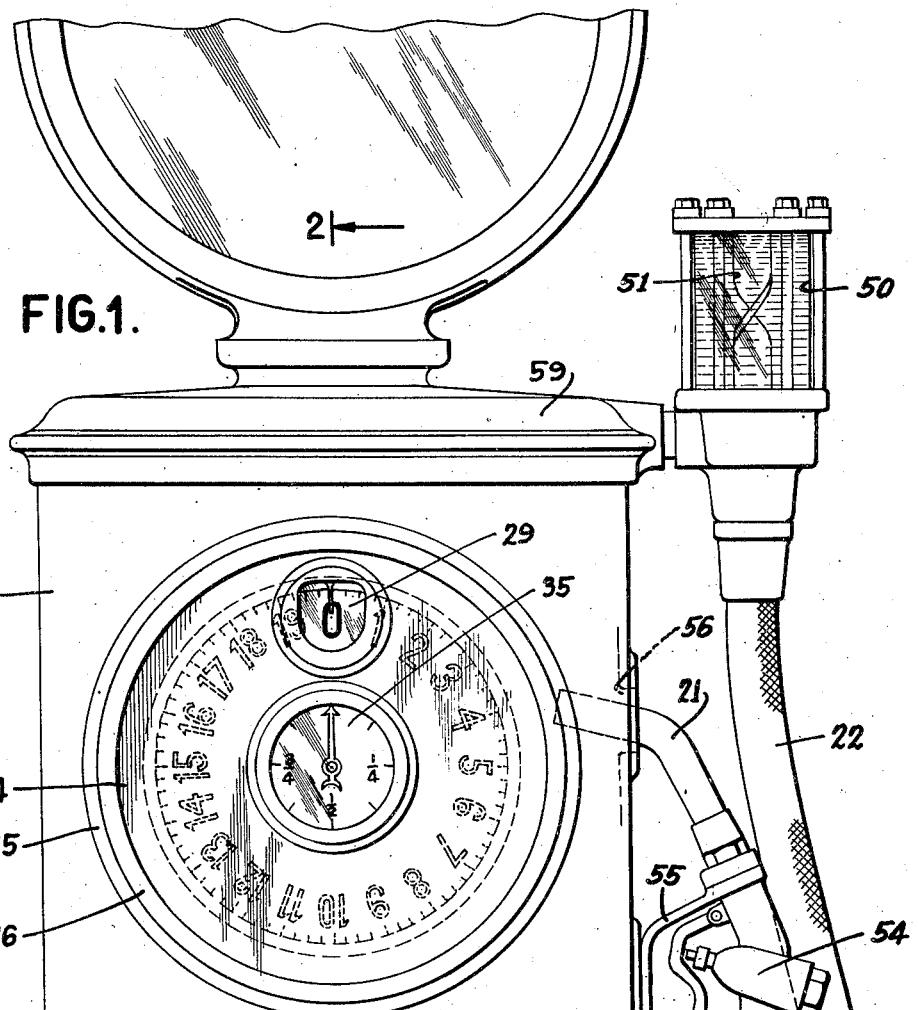
Figure 1 is a view showing, in side elevation, a fragmentary portion of a fluid dispensing device according to this invention and particularly the means whereby the number of units of fluid dispensed is indicated to the purchaser.

Referring first to Figure 1, a standard or housing 20 of any convenient shape is adapted to support and contain the devices for elevating the fluid from a tank (not shown), say, beneath the ground and measuring it for delivery from a nozzle 21 on the end of a flexible hose 22 into, say, the fuel tank of a motor vehicle.

In the front of the housing, and at a desirable elevation where it may be easily visible, or, if desired, in both the front and back walls thereof, the housing 20 is formed with openings 23 (Figure 3), preferably circular. As shown, the opening 23 is closed by a circular cover member 24, preferably permanently or irremovably secured at its periphery, outwardly of the housing 20 and having all but its rim portion disposed within the opening 23. A flange 25 is conveniently formed on the periphery of the closure 24, by which it is secured to the housing 20, outwardly thereof. From the flange 25 the closure, which may be pressed out of sheet metal, is directed outwardly as an annular bead 26, of desired conformation to present a finished appearance and afford a strong support for the closure outwardly of the casing. From the annular bead 26 is supported the rear wall or closure proper 24 which is of circular form, and shown as disposed slightly within the marginal surface of the housing. This wall 24 is preferably opaque so as to render invisible the registering mechanism and the major portion of the dial therebehind. An opening 27 is formed in a convenient place in the closure through which a portion of an indicating dial 28 may be visible, as hereinafter more fully described. The opening 27 is adapted to be closed by a transparent closure, such as the lens 29 which may serve to magnify the scale on the dial 28 and at all events renders the scale readily visible while protecting it from the weather. The lens 29 is held in place by a lens retaining ring or annulus permanently secured in position on the closure 24. Behind the lens 29 there is conveniently carried or formed an index 30, which is thus stationary with respect to the rotatable dial 28, for accurate reading of the indication of units of fluid delivered. Also at a convenient place, each closure 24 is depressed as at 31, to form a circular recess which is apertured centrally, as at 32, for the passage of a shaft 33 carrying at its end a fraction hand or pointer 34 adapted to travel over a dial 35 carried within the recess 31 and graduated to show fractions of the unit of measure (say gallons) delivered by the pump. The pointers 34 are rotated over the respective fraction dials, being driven in any convenient fashion from a meter driven jack shaft 69, say the gears between the jack shaft and the shafts on which the pointers are carried. The stationary fraction dial 35 and movable fraction pointer 34 are enclosed to protect them against the weather and to prevent their being tampered with, by means of a transparent closure, say a glass or lens 36, which rests against an annular packing 37 and is secured in place on the closure 24 by a bezel 38. The closure wall 24 is preferably made opaque so that it covers and renders invisible the disc or dial 28 rotatable therebehind, which disc is graduated and numbered to show the units of liquid, say, gallons, delivered from the nozzle 21. When no liquid has been delivered, the zero on the dial appears behind the window at the index 30. As the dial 28 is rotated by the meter, that number indicating, enumerating or counting the number of units of liquid delivered in the particular dispensing transaction is brought before the window 27 and is the only number visible either to the purchaser or to the salesman. The apparatus according to this invention is so devised that the number indicating the number of units delivered in the transaction will remain visible at the index 30 until the nozzle 21 is taken off its support 39 for delivery of liquid in the next transaction.

Referring now to Figure 7, the fluid is drawn from the tank, say, beneath the ground (not shown), by flow establishing means, such as a pump 43, driven, say, by the electric motor 44, from which pump 43 it is delivered by the pipe 45 to a meter 46. Obviously, means other than a motor driven pump may be resorted to to force the fluid from the tank through the meter to the hose. The particular means for elevating the fluid forms no part of the invention and the pump 43 and motor 44 are illustrative only and may be replaced by any other means, mechanical, fluid pressure or otherwise. The meter 46 may be of any convenient kind, and is provided with a meter shaft 47 which is rotated once for every unit of measure of fluid passing through the meter. Preferably gearing 48 (Figure 2) within the meter is of such ratio that the meter shaft revolves once for each gallon, say, of fluid delivered. From the meter 46, the fluid is delivered, as by the pipe 49, (Fig. 7) preferably to a transparent sight feed 50 (Figure 1) or other visible discharge device which may, if desired, have a suitable flow indicator 51. From the pipe 49 or sight feed 50 the fluid passes into the hose 22 for delivery from the nozzle 21.

While the flow of fluid may be controlled at any point between the pump and nozzle, the flow of fluid through the nozzle 21 is shown as controlled by a manually operable nozzle controlling device located preferably proximate the nozzle. For convenience, the handle of valve 54 (Fig. 1) is protected by a guard 55. Thus the meter pipe 49, sight feed 50 and/or hose 22 are always filled with the fluid. When not in use, the end of the hose 22 is supported on a nozzle support frequently called a nozzle hook carried with the housing 20. While shown mounted outwardly of the housing, it is within the purview of the invention to support the valve in any convenient manner within the housing. As illustrated, pins or lugs 56, conveniently on the valve body, are supported upon a nozzle support such as the forked bracket 39 so that, if desired, the open end of the nozzle 21 is within the housing 20 through an opening 56 in the wall thereof and is thus protected against the weather.

The mechanism indicating or registering the units of fluid delivered from the nozzle 21 is supported upon and above a transversely extending supporting means shown as a platform 57 (Figure 2) carried upon pillars 58 extending upwardly within the housing 20 from the base of or support for the structure and which platform 57 also carries therebelow, if desired, the meter 46. The pump and motor are shown as supported upon the pillars 58. The pillars 58 are also shown as extending upwardly or vertically to the top of the structure and, if desired, supporting the dome and/or lamp standard 59. Upon the platform 57 at the front and rear thereof, respectively, between the pillars 58, are bearing frames 60 which are suitably braced and spaced by the spacing rods 61, which pass through the frames 60 and abut, if desired, against the front and rear walls of the housing 20. The platform 57, bearing frames 60 and pillars 58 may thus support all of the operative devices of the delivery and/or indicating mechanism and the entire support structure for such mechanism is independent of the housing 20 so that different shapes of enclosures or housings may be adopted while the mechanism may be standard for all.

Rotating in a bearing 62 of the frame 60 is a driven shaft 33 (Figure 3), on which the pointer 34 is carried. In the illustrated embodiment this shaft 33 passes through sleeves 63 rotatable in the journals 62, the driven shaft 33 being freely rotatable in the sleeves 63. The end of this shaft 33 passes through the aperture 32 in the cover member 24 and, within the recess 31, carries the pointer 34 indicating the fractions of the unit of fluid delivered from the nozzle 21.

Figure 3:
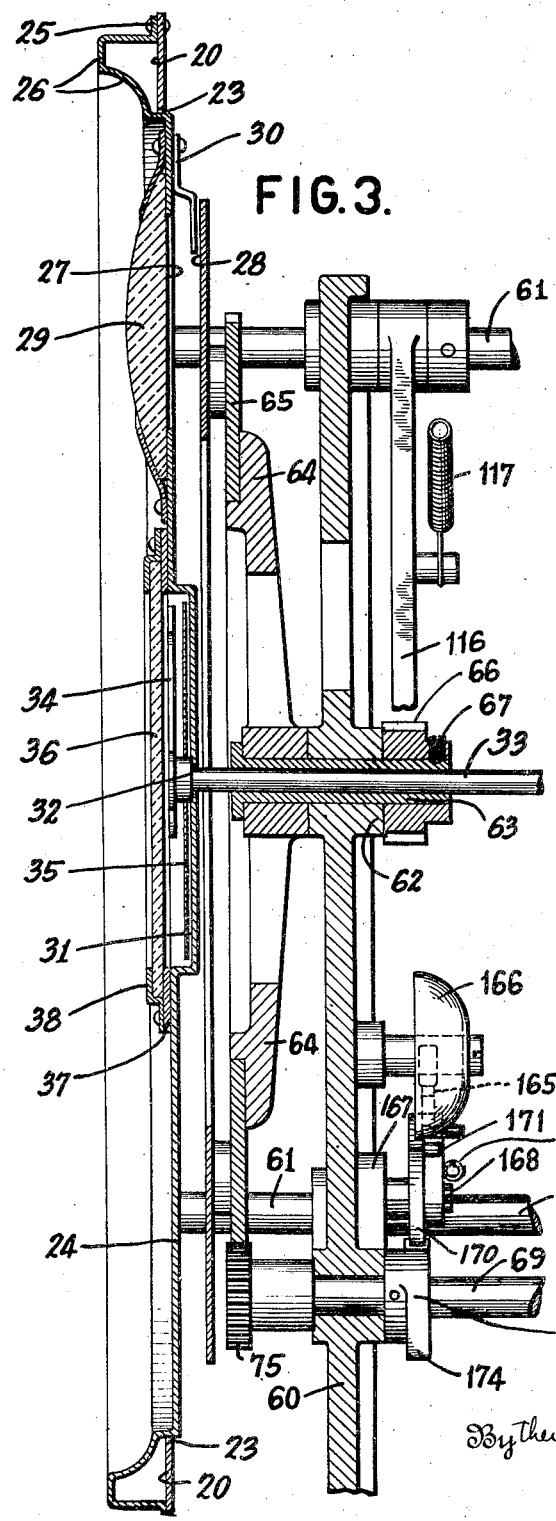
Figure 3 is a fragmentary sectional view, on an enlarged scale, of the indicating mechanism and a portion of the drive therefor, shown on the left hand side of Figure 2.
Figure 4:
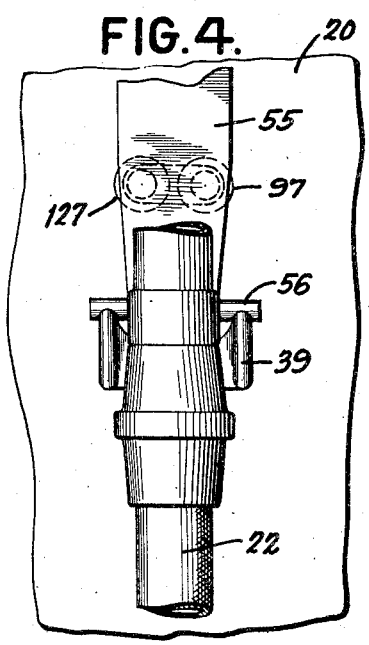
Figure 4 is a detailed view showing a fragmentary portion of the nozzle and the support or hook therefor on the outside of the casing and the means which initiates the return of the indicating mechanism to zero.
Figure 5:
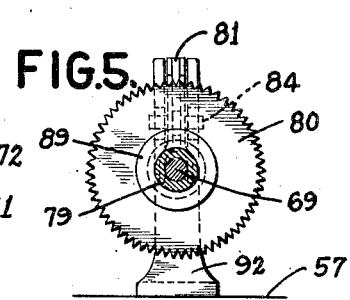
Figure 5 is a fragmentary sectional view taken on the line 5—5 of Figure 2, looking in the direction of the arrows, and showing details of clutch mechanism.

Outwardly of the frames 60 upon the sleeves 63, and rotating therewith, are spiders 64, each spider supporting an annular gear 65 with which the unit dial 28 is mounted, and by which the dial is turned or rotated, in one direction, in recording the delivery of fluid. At one side, inwardly of the frame 60, as shown in Figures 2 and 3, the sleeve 63 also carries a pinion 66 fixed thereon, as by a set screw 67, by which the sleeve 63 and spider 64 thereon are rotated in the opposite direction to return the indicating parts to zero or initial position.

Upon the shaft 33, illustrated as inwardly of the frame 60, there is fixed a gear 68 by which the shaft 33 is rotated. within and independently of the sleeve 63, from a jack shaft 69 adapted, in this embodiment, to rotate once for every two units, say, gallons, of fluid delivered from the nozzle 21. As illustrated, the fraction hand 34 is adapted to register fractions, say, quarters or eighths of such unit. One revolution of the driven shaft 33 therefore registers one unit and the gearing, say the train of gears shown as the gear 68, (Figure 10) an intermediate idler gear 71 and a gear 70 on the jack shaft 69, are so proportioned that the driven shaft 33 rotates twice as fast as the jack shaft, that is, makes one revolution while the jack shaft is turning half way around.

The jack shaft 69 is also journaled in the frames 60 and has fixed to its ends, outwardly of the frames, pinions 75 in mesh with the annular gear 65 carried with the spiders 64 and by which the unit dials 28 are supported, whereby said dials 28 are rotated directly from the jack shaft 69. The pinions 75 are so proportioned with respect to the annular gears 65 that one graduation on the dial travels past the index 30 for each half revolution of the jack shaft 69 or unit of fluid delivered.

The jack shaft 69 is rotated from the meter shaft 47, being clutched thereto for the purpose of recording the number of units of measure of fluid delivered by the pump and being declutched or released therefrom to permit the zero graduation on the dials 28 to be rotated in the opposite direction for return to the index 30. To this end, the jack shaft 69 carries a bevel gear 77 by which it is rotated from a bevel pinion 78 on the meter shaft 47. The bevel gear 77 is so proportioned with respect to the bevel pinion 78 that the jack shaft in this embodiment makes a half revolution for each revolution of the meter shaft 47, that is, one-half revolution for each unit of fluid passing through the meter. The bevel gear 77 is not fixed to the jack shaft 69, but is adapted to be clutched to and declutched therefrom in any convenient manner. As shown, the bevel gear 77 is carried upon a sleeve 79 freely rotatable, i. e. loose, on the jack shaft 69. Also carried on this sleeve 79 and fixed thereto is a clutch member illustrated as a wheel or disc 80 formed with teeth on its periphery adapted to be engaged by a co-operating clutch member fixed on the jack shaft 69. The cooperating clutch member may take the form of a detent 81 movable into and out of engagement with the teeth, between the ends of a bifurcated arm 82 fixed on the jack shaft 69. The detent 81 is shown as fixed upon the end of an L-shaped downwardly extending detent lever 83 pivoted between its ends, as at 84 to the arm 82 and having its lower end 85 proximate the jack shaft 69. The detent 81 forms a part of the upper end of the detent lever 83 and tends to engage with the toothed disc clutching member 80 by virtue of the tendency of the detent lever 83 to rotate about its fulcrum 84 in a counter-clockwise direction as viewed in Figure 2. The means causing this counter-clockwise movement may take the form of a coil or tension spring 86 secured at one end to the detent lever 83 and at its other end to an ear 87 on the arm 83 on the jack shaft 69. Thus, the co-operating clutch members 80, 81 may be in engagement and the jack shaft 69 turned by the bevel gear 77 which is driven by the meter 46. To declutch the jack shaft 69 from the gear 77, a sleeve 88, slidable on the shaft 69, is moved into engagement with the lower end 85 of the clutch lever 83 and moves that end toward the arm 82, i. e., to the left as viewed in Figure 2, to cause the detent 81 to be disengaged from the toothed clutch disc 80 thereby freeing or releasing the jack shaft 69 from the bevel gear 77 for rotation in the opposite direction by the reverse rotation of the gearing as the dials are returned to zero.

The sleeve 88 is reciprocated on the shaft 69 to bring it into and out of contact with the clutch by being engaged by a clutch shifting fork within a groove formed, say, by spaced circumferential flanges 89 thereon. A bifurcated arm or fork 90 is fixed on a rock shaft 91 journaled in a bracket 92 mounted on the platform 57. The rock shaft 91 also carries fixedly thereon a clutch shifting arm or clutch actuating lever 93 normally extending substantially horizontally when the clutch members 80, 81 are in engagement and adapted to be depressed to cause the disengagement of the clutch members to release the registering mechanism for its return to initial position when the nozzle 21 is first taken off the nozzle support 39. A spring 94 (Figure 2) normally holds the arm 93 in the horizontal position whereby the clutch members are in engagement.

When the end of the hose is in inoperative position its weight is utilized to hold the clutch actuating means in inoperative position. As shown, when the nozzle 21 is on the nozzle support 39, the guard 55 thereof holds the clutch lever actuating or controlling means associated therewith in inoperative position. This may be accomplished in any convenient fashion but preferably a portion of the delivery hose holds, inwardly of the housing, or depressed, lever arm 97 (Figures 10 and 11) adapted to reciprocate as within an aperture 98 formed in the housing 20 proximate the nozzle support 39. This lever 97 may form one arm of a bell crank lever 97, 99 which is pivotally mounted upon a bracket 100 carried by the platform 57 within the housing 20. The bell crank tends to rotate in a counter-clockwise direction as viewed in Figure 10, the end of the arm 97 being retained in inoperative position by the nozzle, in its path of movement and when the nozzle, say, is manually moved from the support, the lever 97, 99 moves out through the aperture 98 in the housing. In moving, the arm tends to actuate the clutch actuating or shifting lever 93. Obviously, a spring or any other means may serve to operate the arm 99 but such means are here shown as the weight 101. Thus, when the operating or control means 97 is in its operable position extending outwardly of the aperture it tends to prevent or oppose the return of the nozzle to its support.

At its end, the arm 99 carries, preferably, pivotally thereon, a tripping pawl 104 adapted to engage a bearing surface 105 on the end of the clutch shifting arm or clutch lever 93 to release the clutch. When the arm 97 is held depressed by the guard 55 of the valve 54, the arm 99 is in such position that the tripping pawl 104 is located over the end of the clutch shifting arm 93, in spaced relation thereto, if desired.

The tripping pawl 104 has a controlling arm 106 extending in a direction opposite to that of the pawl and also has an ear 107 to which is secured one end of a tension spring 108, the other end of which is secured to the bell crank lever arm 99. This spring 108 tends to return the pawl to normal position which is determined by the controlling arm 106 abutting a stop 109 on the arm 99 which stop thereby serves to prevent rotation of the trip 104 upwardly, (i. e., in a clockwise direction, as viewed in Figure 10), beyond a certain point. When the nozzle 21 is removed from its support 39, for the purpose, say, of delivering fluid into the fuel tank of a motor vehicle, the end of arm 97 is released and the bell crank 97, 99 is free to rotate under the influence of the weight 101 and its downwardly rotating arm 99, or the tripping pawl 104 thereon, moves the clutch releasing arm 93 downwardly thereby causing the bifurcated arm 90 to move the sleeve 88 to the left, as viewed in Figure 2, to engage and move the end 85 of the clutch lever 83 to the left to disconnect the clutch and permit the shaft 69 to turn freely for the purpose of permitting the registering mechanism to be returned to zero position before delivery of the fluid commences, whereby it can begin to record the number of units delivered in the ensuing transaction. The bell-crank 97, 99 is thus a control member for the train of members the operation of which it effects or initiates.

The nozzle 21 remains off its support 63 in order that fluid may be delivered therefrom and the clutch lever actuating member 97, 99 remains, therefore, in its active position. However, after the indicating dials have been returned to zero position, the jack shaft 69 must again be clutched to the meter shaft 47 in order that when the pump 43 begins to function as the zero on the dials reaches the index and becomes visible, in this instance, through the openings, the delivery of fluid will be recorded by the registering mechanism. The clutch lever actuating member, in this instance, the bell crank 97, 99 is, therefore, so designed as to ride past the clutch actuating lever 93 after that lever has reached the position in which the jack shaft 69 is declutched from the meter shaft 47 so that the lever may be raised by suitable means, such as the tension spring 94 to reconnect the jack shaft with the meter shaft when the actuation of the fluid elevating means is initiated, although the bell crank 97, 99 is still depressed. The arm 99 being pivoted, the end of that arm or the tripping pawl 104 thereon travels in an arc about the axis 100 of the pivot and, therefore, as the arm 99 rotates downwardly the distance of its end in an horizontal plane from the pivot 100 becomes less until it is able to slip past the clutch lever 93.

Any suitable means may be provided for holding the clutch lever 93 depressed until it is time to operate the pump. As shown, (Figure 2) as the clutch shifting arm 93 is depressed by the bell crank 99, it is brought against an inwardly and downwardly extending latch arm 112 of a lever fulcrumed at 113 on the frame 60 which arm 112 yields outwardly to release arm 93 and permit the clutch shifting arm 93 to pass beneath a shoulder 114 thereon. As viewed in Figure 7, this arm 112 is normally urged in a clockwise direction by means of suitable means such as a spring 115 extending between it and the frame. The other end 111 of the lever is curved toward the dial 28 and under the influence of the spring 115 engages the rear surface of the dial. Now when the bell crank arm 99 is actuated, say, by the removal of the nozzle from the hook, to shift the clutch lever 93, the end 105 is pressed downwardly past the shoulder 114, which then springs back over the bearing surface 105 under the influence of the spring 115 and the shoulder 114 holds or retains the arm 93 down and the clutch in open position.

Figure 10:
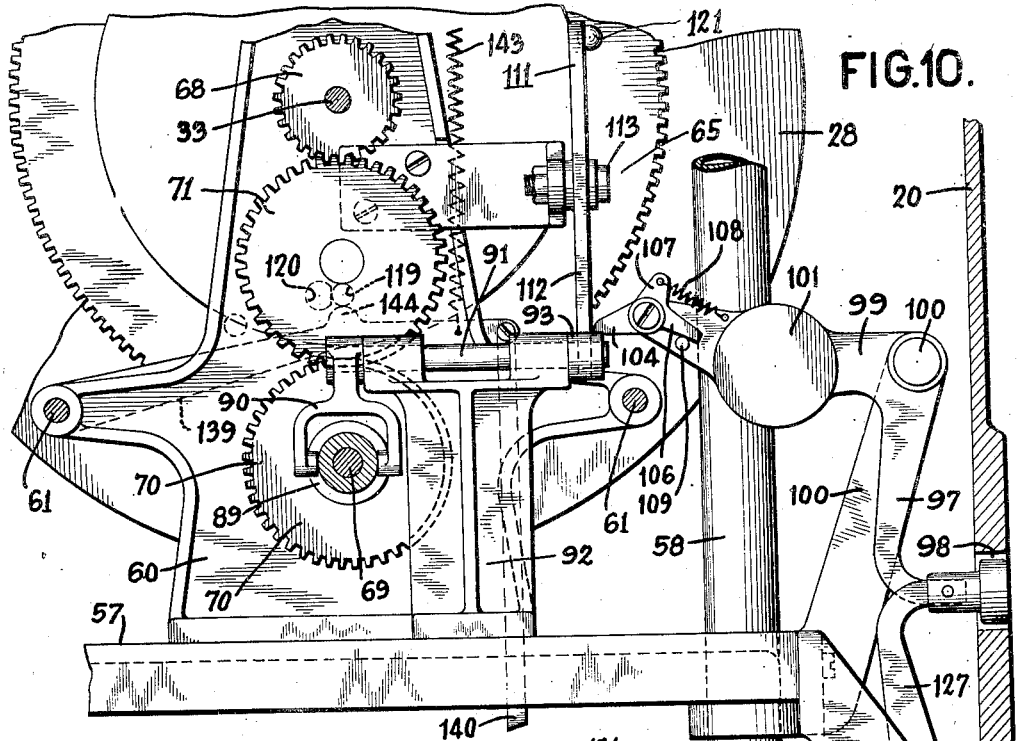
Figure 10 is a fragmentary view, taken on the line 10—10 of Figure 2 and looking in the direction of the arrows, and showing particularly the means for controlling the return of the indicating mechanism to zero position and the clutch release mechanism.
Figure 11:
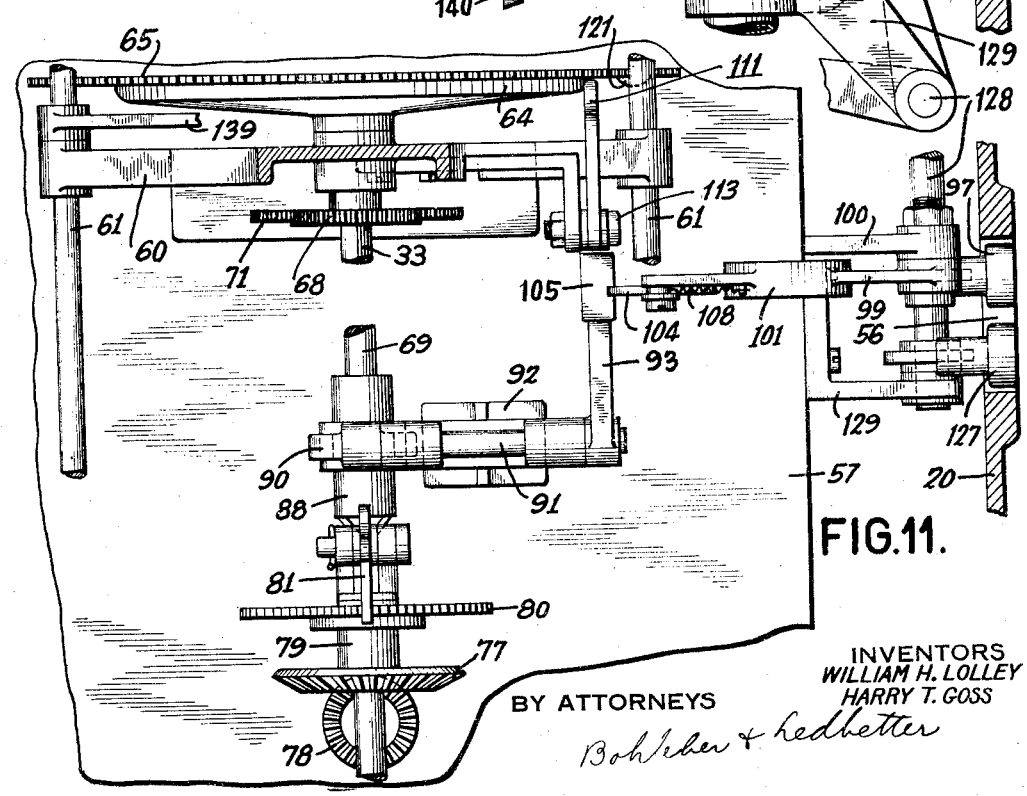
Figure 11 is a fragmentary view in transverse section taken in the plane indicated by the line 11—11 of Figure 6, looking in the direction of the arrows, and showing particularly the clutch release mechanism.

The dial 28 may be returned or reset to initial position by any convenient means but it is preferred that the return of the dial be accomplished by motor means, the energy of which is stored up, if desired, by the rotation of the dials in recording the delivery of fluid. Preferably, this motor means takes the form of a segment gear or curved rack 116, Figure 6, pivotally mounted say, upon one of the spacing rods 61, the segment gear 116 being in mesh with the pinion 66 keyed to the sleeve 63 upon which the spider 64 is fixed. A spring 117 is secured at one end to the opposite spacing rod 61 and at its other end is secured to the segment gear 116 or to an arm 118 forming a part thereof. When the delivery of fluid is recorded and the dial 28 rotated in a clockwise direction, as viewed in Figure 6, the segment gear 116 is rotated about its pivot 61 in a counter-clockwise direction thereby putting the spring 117 under tension, and its tendency there is to restore the counters 28 to initial position. Upon release of the jack shaft 69 for free rotation and thereby the release of the dials 28, the power storing means 117 automatically draws the segment gear 116 in a clockwise direction, as viewed in Figure 6, causing the rotation of the pinion 66 and with it the sleeve 63 about the shaft 33 which carries the spider 64 and dial 28 thereon back to zero position. To stop the zero on the dial at the index 30, as it is thus set back, a stop 119, Figure 10, is carried by the dial 28 for engagement at zero position with a stop 120 on, say, the frame 60. When these stops 119 and 120 come into contact, the zero on the dial is at the index 30.

If, before the dial 28 is restored to zero position, the nozzle 21 should be returned to its support 39 for any reason, the arm 99 will again be rotated upwardly although the clutch lever 93 will be retained in clutch releasing position by the clutch arm latch 114. As the arm 99 moves upwardly, the upper edge of the tripping pawl 104 will strike the lower surface of the clutch lever 93, and the pawl 104 will be rotated in a counter-clockwise direction against the action of spring 108 to permit the end to move past the clutch lever 93. The clutch lever is thus held down so that the clutch remains released and no delivery of fluid is recorded, there being no delivery, however, because the dials 28 have not returned to zero position and the actuation of the fluid elevating means is not initiated until the dials reach zero position. When, however, the dial rotates to zero, a boss 121 on the rear face of the dial 28 engages and trips the lever arm 111 (Figures 6 and 7) cooperatively associated with the clutch lever thereby moving the lever arm 112 outwardly to bring the locking shoulder 114 away from the clutch lever 93, or to its inoperative position, thereby releasing that lever which is then drawn upwardly by the spring 94 to enable the clutch members 80 and 81 to engage one with another whereby the jack shaft 69 may be turned by the meter 46 as fluid is delivered. It must be appreciated that it is desirable to stop the fluid elevating means 43 immediately upon replacement of the nozzle 21 on its support 39, and to this end any suitable devices may be provided to interrupt a circuit holding the motor circuit closed. At the same time, because of the requirement that the actuation of the fluid elevating means 43 be not initiated until the indicating means 28 has been returned to initial position, there is a lapse of time after the nozzle 21 is removed from the support 39 before the fluid elevating means 43 commences to function. In the illustrated embodiment, the holding circuit is interrupted, therefore, at two points, one set of control contacts or switch 124 (Figure 9) being closed when the nozzle 21 is taken off its support 39, while the other set of control contacts or switch 125 is closed when the dial 28 reaches zero position. In order that the motor 43 can operate, a gap in the motor circuit must be closed by the switches 152 and this is accomplished by an electro-magnet, the circuit of which is not completed until the second or enabling switch 125 is closed or rendered effective by the return of the dials to zero position. So soon as dial 28 commences to record the delivery of fuel, its movement away from zero position opens or renders inoperative the second switch 125. However, so long as the holding switch 124 is closed, the electromagnet is energized and the motor circuit remains closed. When the nozzle is returned to its support, the holding switch 124 is opened, interrupting the holding circuit and the motor circuit is opened, terminating the operation of the motor and stopping the fluid elevating devices immediately.

The holding switch 124 is closed in the following manner:—

Adapted to be depressed by the weight of the nozzle 21 is a switch actuating arm 127. This control arm is shown to pass through aperture 98 when the nozzle 21 is manually removed from its support. It is fixed on a rock shaft 128 which is journaled in brackets 129 extending downwardly from the platform 57. A second arm 130 (Figure 6) is also fixed on the rock shaft 128 and is normally urged in a clockwise direction (as viewed in Figure 6) to turn the rock shaft 128 and thereby urge the end of the follower arm 127 through the aperture 98 or at least against the weight of the nozzle in a manner similar to the operating means 97, 99, a tension spring 131 extending between the arm 130 and, say, the bracket 129 for this purpose. Follower arm 127 is connected by a link 132 with one arm 133 of a switch controlling bell crank 133, 134 pivotally mounted on the control box 135, the other arm 134 of which controls the contacts 124. When nozzle 21 is removed from its support 39 thereby releasing the follower arm 127 and permitting the arm 130 to rotate under the influence of the spring 131, the upward movement of the link 132 rotates bell crank 133, 134 in a clockwise direction as viewed in Figures 6 and 9 to release the contacts 124 and permit them to close due to their inherent resiliency. Contacts 124 are closed immediately upon the removal of the nozzle from its support and one of the two switches in the holding circuit is thus closed. This switch 124, after the holding circuit is energized, maintains the circuit energized and the pump motor in operation even though the dial 28 moves away from zero in recording the delivery of fluid.

Figure 6:
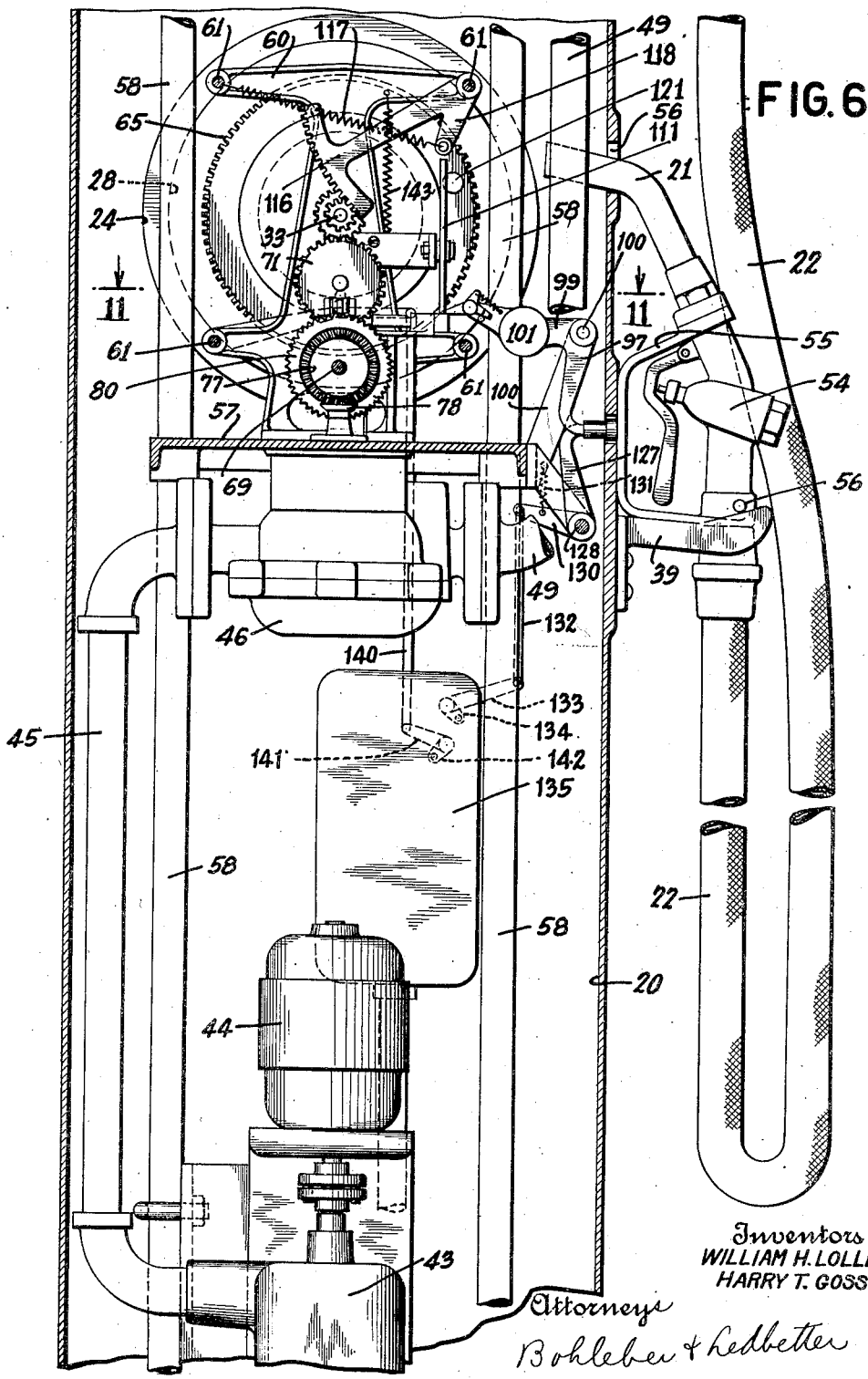
Figure 6 is a vertical sectional view, taken on the line 6—6 of Figure 2, looking in the direction of the arrows and showing the indicating mechanism, the fluid meter, the pump and the control therefor.

The holding circuit is completed so that the pump will start delivering fluid as soon as the dials 28 are returned to zero position. Preferably the stop 119 on the dial 28 is utilized to complete the initiating the closing of the circuit by closing the second contacts 125 here referred to as the auxiliary or enabling switch. A rocking lever 139 (Figure 10) is pivotally mounted upon one of the spacing rods 61 and at its free end is connected to a link 140 leading downwardly to one arm 141, a switch actuating bell crank 141, 142 pivotally mounted on the motor control box 135 containing the circuit closers and auxiliary devices of the motor circuit, as will be more fully brought out hereinafter. When this link 140 is depressed by the downward movement of the lever 139, the contacts 125 are closed. The contacts are held open or permitted to separate by virtue of their inherent resiliency by the provision of a control spring 143 which normally tends to pull the control lever 139 upwardly, thus drawing the link 140 upwardly and keeping the circuit open until the rotation of the dial 28 is stopped by the engagement of the stops 119, 120. The power storing means 143 thus normally prevents the closing of the switch except when the indicator is at the predetermined position. When, however, the zero on the dial reaches initial position, the stop 119 moves into engagement with a projecting portion or boss 144 (Figure 10) on the lever 139 deflecting it downwardly to close the auxiliary contacts 125. Downward movement of link 140 causes rotation of the bell crank 141, 142 in a counter-clockwise direction as shown in Figures 6 and 9 and causes the insulated end of lever 142 to close the normally inoperative contacts 125. So soon as this enabling switch 125 is closed, the maintaining means or holding switch 124 being already closed, the holding circuit is established and the operation of the liquid supply means automatically permitted. Current then flows from the main 145 through contacts 124, line 146, contacts 125, line 147, branch 148, solenoid winding 149 and line 150 to main 151. This circuit energizes the electromagnet 126 thereby closing a series of contacts, to wit, contacts 152 of the motor circuit and a pair of contacts 153 in a holding circuit. In the holding circuit thus established current flows from the main 145, the closed contacts 124, line 154, contacts 153, line 147, line 148, winding 149 of the electromagnet 126 and line 150 to the main 151. The holding circuit remains established or is maintained so long as contacts 124 remain closed and even though the enabling contacts 125 are opened by the rotation of the dial from zero in recording the units of fluid delivered by the pump.

At the same time, the motor circuit is established since current flows from the main 145, line 155, contacts 152, line 156, motor 43, line 158, contacts 152, line 159 to main 151.

When the zero on the indicator dial 28 starts to move away from the index 60, the lever 139 and its controlling connecting link 140 raises under the influence of spring 143 and the contacts 125 are opened. However due to the holding circuit, the solenoid 126 remains energized to keep the motor circuit closed and the motor 43 continues to run until the contacts 124 are opened by the return of the nozzle 21 to its support 39. When this occurs, the lever 130 is moved counter-clockwise and the contacts 124 opened. This de-energizes the solenoid 126 and the motor circuit is broken and the motor operation comes to a halt.

During the delivery of fluid, as the meter shaft 47 rotates, the jack shaft 69 is rotated, which in turn rotates the dials 28 by means of the pinions 75, the pinions 75 and annular gears 76 being so proportioned that the numerals representing the several units of measure are brought past the index 30 as units of fluid are delivered by the pump 44 while at the same time shaft 33 is rotated from the jack shaft 69 to register fractions of each unit as they are delivered. If at any time while the pump 44 is operating, the valve should be closed and a pressure built up within the system, such pressure, after a predetermined maximum is reached, will open a pressure relief valve 162 and permit the fluid to return to the reservoir from which it has been drawn through the pipe 163.

Figure 12:
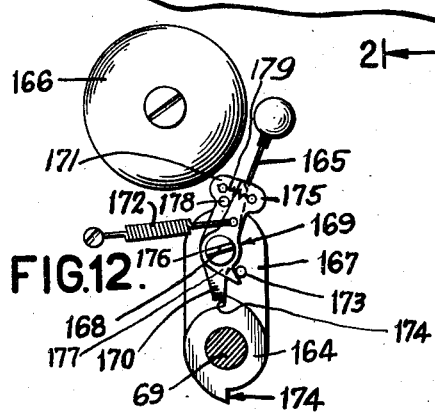
Figure 12 is a detail view showing means for audibly indicating the delivery of a unit of fluid from the nozzle.

In order to give an audible indication of each unit of fluid passing through the meter 46, the jack shaft 69 carries a cam 164 (Figure 12) adapted to actuate the clapper 165 of a bell 166 as the jack shaft rotates in one direction when driven by the meter. When, however, the jack shaft is declutched from the meter and rotates in the opposite direction driven by the dials in their return to initial position, provision is made to permit the cam 164 to ride past the clapper without causing its vibration. Mounted, say, upon a boss 167 on the frame 60 immediately above the jack shaft 69 is a pin 168 upon which freely rocks a lever 169 having a downwardly extending arm 170 and an upwardly extending arm 171, the downwardly extending arm being adapted to be engaged by the shoulders 174 on the cam 164. The clapper 165 is attached to an upwardly extending clapper supporting arm 175, of a lever 176, also adapted to rock on the pin 168. The lever has a downwardly extending arm 177 adapted to come into contact with a pin 173 to limit the rotation of the lever 176 in a counter-clockwise direction, as viewed in Figure 12, the lever 176 being freely rotatable in a clockwise direction and adapted to be moved in that direction with the lever 169 by a pin 178 carried on the arm 171 and adapted to come into contact with the clapper supporting arm 175 and rotate that arm in a clockwise direction when the lever 169 is rocked by the cam 164. The upwardly extending clapper supporting arm 175 tends to remain in contact with the pin 178 by the action of a spring 179 connected at its respective ends to the arms 171 and 175, the spring 179, however, permitting the lever arm 171 to be rocked in a counter-clockwise direction when the cam 164 strikes the downwardly extending arm 170 and carries it to the right. This movement does not cause the clapper 165 to approach the bell because the arm 175 is not permitted to follow the arm 171 because of the engagement of the arm 177 with the pin 173 against which it is normally urged by the spring 172. Thus when the jack shaft 69 rotates through one-half revolution, the bell 166 is struck once for each unit of fluid measured by the meter 46 and delivered by the nozzle 21, but when the jack shaft rotates in the opposite direction, the clapper is enabled to remain stationary so that no audible indication is given.

The operation of the registering device for liquid dispensing apparatus is apparent from the foregoing description. Briefly, the cycle of the operations for each transaction is as follows:—

It may be assumed that the indicating means or dial occupies a position to which it has been moved from the desired or initial or zero position in a preceding transaction, so that a number representing the number of units of liquid delivered in the previous transaction is visible before the window. When the liquid delivery means, i. e., the nozzle and/or valve, is removed from its support preparatory to delivering liquid in the subsequent transaction, the meter is disengaged from the indicating mechanism so that the indicating mechanism may be automatically returned to zero. At the same time, a switch in a holding circuit for the motor circuit is closed. This is accomplished by operating means illustrated as the rockable lever system 97 and 127 which, when depressed, is normally maintained in non-interfering relation with the nozzle when on its hook but movable to a position operative to start the train of movements resulting in the parts being in position to deliver fluid, the lever system then occupying a position to interfere with or oppose the replacement of the nozzle on the support. The fluid elevating means is not started, however, until the indicating means has returned to initial position. The clutch between the meter and the drive for the indicating mechanism is, therefore, held released until the indicating means reaches initial position, at which time the meter is again automatically clutched to the indicating mechanism and the holding circuit for the motor circuit is completed, whereby the motor circuit is closed and the motor commences to operate to actuate the fluid elevating means. The movements may occur so rapidly, however, that the clutch is disengaged just prior to the starting of the forcing means 43, 44. The flow of liquid initiated by the motor driven pump, of course, actuates the meter when the nozzle 21 is opened thereby establishing a flow of liquid causing the movement of the indicating means away from the initial position in proportion to the amount of liquid passing through the meter to indicate the number of units of liquid delivered. Coincident with the establishment of flow when the meter moves, power is stored, as a result of the operation of the liquid flow establishing means, in the instrumentalities adapted to restore the indicator to its predetermined position. The operation of the liquid elevating means continues until the fluid delivery means is returned to its support when the motor circuit is broken by interrupting the holding circuit, the meter remaining clutched to the indicating means whereby the indication of the number of units of liquid delivered in that transaction remains visible. There is thus an elapse of time between the removal of the fluid delivery means from its support until the fluid elevating means commences to operate. The elapsed time mechanism is illustrated as the return rotation of the indicating means to initial position, but it will be obvious that, in some circumstances, any suitable elapsed time means may be availed of whereby the operation of the fluid elevating means is delayed for any purpose after a cycle of operations commences.

An interlock 112 is provided between the resetting mechanism and the clutch whereby the interconnection between the meter shaft and the counter mechanism, including the rotatable member 65, is ineffectual until the indicator is at zero position. In other words, resetting of the indicator is prevented while the clutch is engaged. When the zeroizing cycle is completed, cam means 121, here shown as on the rotatable member 65, releases the latch 112 to permit the interconnection between the meter and the indicator. Synchronously therewith, cam means 119, here shown as carried with the rotatable member 65, releases the lever 139 from the control of the retaining spring 143 which spring normally prevents the control switch 125 from initiating the operation of the flow establishing means and thereby retains the switch open until the indicator is restored to initial position and insures the meter 28, 30 being at zero position when delivery commences. The link 140 and its associated parts thus interconnect an actuating switch in the motor circuit and the resetting mechanism. Viewed in its entirety, the control 125 is made operative by the removal of the nozzle from the support. Movement of the control means 97 releases the indicator for its return to initial position under the influence of power stored up in the spring 117 in a previous transaction of delivering fluid. The indicator, or more specifically, the returning means here shown as the rotatable or movable member 65, which moves with the rotatable element of the meter 28, and comprises resetting shaft 33 and the pinion 66 with which the spring pressed rack 116 engages, is shown as carrying a cam means or pin 119 for the purpose hereinabove described, but so soon as the returning means 66, 116 moves away from initial position, the spring 143 renders the control 125 inoperative whereby the switch is held open while the indicating means is moving away from initial position and until the indicating mechanism is set back to zero position by the manually effected actuation of the control 97. When the nozzle is returned to its support, the switch 124 is opened which results in the opening of the switch 152. Switch 152 is held open with the pump idle until the indicating mechanism is set back to zero position which may be said to occur simultaneously with starting the apparatus in the succeeding dispensing operation, in the sequence of movements described.

It will thus be seen that a fluid metering device has been provided which is suitable for dispensing gasoline and other motor fuels at wayside service stations. It is adaptable to housings of different configuration and design so that different distributors may adopt distinctive housings without necessitating a change in the construction of the operating mechanism. Only the total number of units of fluid delivered in a particular transaction is visible alike to purchaser and attendant and such indication remains visible until the next sale, so that all chance of confusion is eliminated. Furthermore, the return of the indicating dial to zero position is entirely automatic, all mechanism being so enclosed as to preclude tampering by a dishonest dealer. Both the return of the dial to initial position and the starting of the pump are initiated by the removal of the nozzle from its support and the hose is filled with fluid at all times thus assuring the purchaser full measure.

Various modifications will occur to those skilled in the art in the disposition and configuration of the component elements going to make up this invention as a whole as well as in the selection and/or combinations of certain of the features independently of others or the substitution therefor of other means accomplishing the same result, and no limitation is intended by the phraseology of the foregoing description or illustrations in the accompanying drawings except as indicated in the appended claims.

What is claimed is:—

1. In liquid dispensing apparatus having flow establishing means and liquid metering means, in combination, indicating means movable by the liquid metering means from an initial position in proportion to the amount of liquid passed through the metering means, and means to initiate the operation of the liquid flow establishing means dependent upon the return of the indicating means to initial position.

2. In liquid dispensing apparatus having flow establishing means and liquid metering means, in combination, indicating means movable by the liquid metering means from an initial position in proportion to the amount of liquid passed through the metering means, means to return the indicating means to initial position, and means to initiate the operation of the flow establishing means only when the indicating means reaches initial position.

3. In liquid dispensing apparatus having a pump and a meter, in combination, indicating means movable by the meter from zero position in proportion to the amount of liquid passed through the meter, means to return the indicating means to zero position, and means controlled by the indicating means when it reaches zero position to start the pump.

4. In liquid dispensing apparatus having liquid flow establishing means, liquid metering means, liquid delivery means and a support therefor, in combination, indicating means, means to return the indicating means to initial position upon removal of the delivery means from the support and means to prevent the operation of the flow establishing means until the indicating means reaches initial position.

5. In liquid dispensing apparatus having flow establishing means and liquid metering means, in combination, indicating means movable by the liquid metering means from an initial position in proportion to the amount of liquid passed through the metering means and automatic means to initiate the operation of the flow establishing means upon the return of the indicating means to initial position.

6. In liquid dispensing apparatus having flow establishing means, liquid metering means, liquid delivery means and a support therefor, in combination, indicating means, means to return the indicating means to initial position upon removal of the delivery means from the support, and automatic means to initiate the operation of the flow establishing means when the indicating means reaches initial position.

7. In liquid dispensing apparatus having flow establishing means and liquid metering means, in combination, indicating means movable by the liquid metering means from an initial position in proportion to the amount of liquid passed through the metering means, means to return the indicating means to initial position, said indicating means initiating the operation of the flow establishing means.

8. In liquid dispensing apparatus having flow establishing means and liquid metering means, in combination, indicating means movable by the liquid metering means from an initial position in proportion to the amount of liquid passed through the metering means, means to return the indicating means to initial position, said indicating means initiating the operation of the flow establishing means when the indicating means reaches initial position.

9. In liquid dispensing apparatus having flow establishing means, liquid metering means, liquid delivery means and a support therefor, in combination, indicating means, means to return the indicating means to initial position upon removal of the delivery means from the support, said indicating means initiating the operation of the flow establishing means when said indicating means reaches initial position.

10. In liquid dispensing apparatus having liquid metering means, liquid delivery means and a support therefor, in combination, registering means, a shaft, operative connections between the registering means and the shaft and a driving connection between the metering means and shaft comprising clutch means whereby the shaft may be disconnected from the metering means, said clutch means being controlled by the removal from and replacement on said support of said liquid delivery means.

11. In liquid dispensing apparatus having liquid metering means and liquid delivery means and a support therefor, in combination, a freely rotatable dial, a shaft, operative connections between the dial and the shaft, a driving connection between the metering means and the shaft comprising clutch means whereby the shaft may be disconnected from the metering means, and means to release said clutch means by the removal of the liquid delivery means from its support.

12. In liquid dispensing apparatus having liquid metering means, liquid delivery means and a support therefor, in combination, a freely rotatable dial, a shaft, a gear thereon, a gear rotating with the dial and in mesh with the gear on the shaft and a driving connection between the metering means and the shaft comprising clutch means whereby the shaft may be disconnected from the metering means, said clutch means being controlled by the relative position of the liquid delivery means with respect to said support.

13. In liquid dispensing apparatus having a meter, in combination, a rotatable indicator, a shaft, operative connections between the indicator and the shaft, a sleeve loose on the shaft, a gear carried thereby, a gear driven by the meter in mesh with said gear and clutch means between the shaft and the sleeve.

14. In liquid dispensing apparatus having a meter, liquid delivery means and a support therefor, in combination, a rotatable indicator, a shaft, operative connections between the indicator and the shaft, a sleeve loose on the shaft, a gear carried thereby, a gear driven by the meter shaft in mesh with said gear, and clutch means between the shaft and the sleeve, said clutch means being released by the removal of the liquid delivery means from the support.

15. In liquid dispensing apparatus having a meter, and liquid delivery means, in combination, a rotatable indicator, a shaft, operative connections between the indicator and the shaft, a sleeve loose on the shaft, a gear carried thereby, a gear driven by the meter in mesh with said gear and clutch means between the shaft and the sleeve and releasable means to actuate the clutch means.

16. In liquid dispensing apparatus having a meter, and liquid delivery means, in combination, a rotatable indicator, a shaft, operative connections between the shaft and the indicator, a sleeve loose on the shaft, a gear carried thereby, a gear driven by the meter in mesh with said gear, and clutch means between the shaft and the sleeve comprising a toothed wheel on the sleeve, and means carried by the shaft to engage the toothed wheel.

17. In liquid dispensing apparatus having a meter, a liquid delivery means and a support therefor, in combination, a rotatable indicator, a shaft, operative connections between the shaft and the indicator, a gear carried by the shaft, a gear driven by the meter in mesh with said gear, clutch mechanism between the shaft and the gear and releasable means to actuate the clutch mechanism controlled by the position of the liquid delivery means on the support.

18. In liquid dispensing apparatus having a meter and liquid delivery means, in combination, a rotatable indicator, a shaft, a gear on the shaft, a gear rotating with the indicator and in mesh with the last named gear, a sleeve loose on the shaft, a gear carried thereby, a gear driven by the meter in mesh with the gear on the sleeve, and clutch mechanism between the shaft and the sleeve comprising a toothed wheel on the sleeve, and means carried by the shaft to engage the toothed wheel.

19. In liquid dispensing apparatus having flow establishing means, a meter and liquid delivery means, in combination, a rotatable indicator, a pinion rotatable with the indicator, a gear in mesh with the pinion, power means to rotate the gear to rotate the indicator in one direction, a shaft, operative connections between the indicator and the shaft, operative connections between the meter and shaft, clutch mechanism between the shaft and the meter, a support for the liquid delivery means, means associated therewith to disengage the clutch to release the shaft from the meter and permit the gear to return the indicator to zero position.

20. In liquid dispensing apparatus having liquid elevating means, a meter and liquid delivery means, in combination, a rotatable indicator, a pinion rotatable with the indicator, a gear in mesh with the pinion, power means to actuate the gear to rotate the indicator in one direction, a jack shaft, a gear thereon, a gear rotating with the indicator and in mesh with the gear on the shaft, operative connections between the shaft and the meter comprising clutch mechanism, a support for the liquid delivery means, means associated therewith which, when the liquid delivery means is off the support, is released to disengage the clutch to release the shaft from the meter and permit the gear to return the indicator to zero position.

21. In liquid dispensing apparatus having a meter and liquid delivery means, in combination, indicating means, a pinion rotatable with the indicating means, a gear in mesh with the pinion, power means to rotate the gear to return the indicating means to initial position, a shaft, operative connections between the indicating means and shaft, operative connections between the meter and shaft comprising clutch mechanism, a support for the liquid delivery means, releasable means controlling the actuation of the clutch and adapted to be engaged by the liquid delivery means when on the support, said releasable means, when released, actuating the clutch to release the shaft from the meter and permit the gear to return the indicating means to initial position.

22. In liquid dispensing apparatus having a meter and liquid delivery means, in combination, a rotatable indicator, a pinion rotatable with the indicator, a gear in mesh with the pinion, power means to rotate the gear, a shaft, operative connections between the shaft and the indicator, operative connections comprising clutch mechanism between the meter and shaft, a support for the liquid delivery means, a lever adapted to be engaged by the liquid delivery means when on the support, said lever being adapted when disengaged to actuate the clutch to release the shaft from the meter and permit the gear to return the indicator to initial position.

23. In liquid dispensing apparatus having a meter and liquid delivery means, in combination, a rotatable indicator, a pinion rotatable with the indicator, a gear in mesh with the pinion, a spring to rotate the gear, a shaft, a gear on an end thereof, a gear rotating with the indicator and in mesh with the last named gear, gearing between the meter and shaft, clutch means between the gearing and shaft, a support for the delivery means, a lever adapted to be engaged by the delivery means when on the support, said lever being adapted when disengaged to actuate the clutch to release the shaft from the meter and permit the spring rotated gear to return the indicator to initial position.

24. In liquid dispensing apparatus having liquid delivery means, in combination, rotatable indicating means, power means to rotate the indicating means, driven means in one direction, operative connections between the indicating means and the driven means, a meter, operative connections between the driven means and the meter comprising clutch means, a support for the liquid delivery means, means adapted to be engaged by the delivery means when on the support, clutch releasing means movable by said engaged means when the delivery means is removed from the support, means to move said clutch releasing means to clutch engaging position, and retaining means for the clutch when released operative until the indicating means returns to initial position.

25. In liquid dispersing apparatus having a meter and liquid delivery means, in combination, a rotatable indicator, means to return the indicator to initial position, a shaft, operative connections between the shaft and the indicator, operative connections between the shaft and meter comprising clutch mechanism, a clutch actuating lever, a support for the liquid delivery means, a lever arm adapted to be engaged by the liquid delivery means when on the support, a second lever arm movable with the first named lever arm, means to move the second lever arm to engage the clutch actuating lever to move the same to disengage the clutch and release the shaft from the meter and permit the indicator to be returned to initial position.

26. In liquid dispensing apparatus having a meter, and liquid delivery means, in combination, a rotatable indicator, a pinion rotatable with the indicator, a gear in mesh with the pinion, power means to rotate the gear to return the indicator to initial position, a shaft, a gear thereon, a gear rotating with the indicator and driven by the last named gear, driving connections between the shaft and the meter, and comprising clutch means, a clutch actuating lever, a support for the liquid delivery means, a bell crank having one arm adapted to be engaged by the nozzle when on the support, means to depress the other arm to engage and depress the clutch actuating lever to disengage the clutch means and release the shaft from the meter and permit the indicator to return to initial position.

27. In liquid dispensing apparatus having a meter, and liquid delivery means, in combination, indicating means, automatic means to return the indicating means to initial position, a shaft, operative connections between the shaft and indicating means, operative connections between the shaft and the meter comprising clutch mechanism, a support for the liquid delivery means, a lever arm adapted to be depressed by the delivery means when on the support, a second arm movable with said lever arm, means to move the second arm to disengage the clutch and release the shaft from the meter and permit the indicating means to be returned to initial position, and means to retain the clutch disengaged adapted to be rendered inoperative by the indicating means upon its return to initial position.

28. In liquid dispensing apparatus having a meter, and liquid delivery means, in combination, a rotatable dial, automatic means to return the dial to initial position, a shaft, operative connections between the dial and the shaft and the meter comprising clutch mechanism having a clutch arm, a support for the liquid delivery means, a bell crank having an arm adapted to be depressed by the delivery means when on the support, means to move the other arm against the action of the delivery means, a tripping pawl on said other arm adapted to depress the clutch arm to thereby disengage the clutch to release the shaft from the meter and permit the automatic means to return the dial to initial position, a latching means to engage the clutch arm when depressed, said tripping pawl permitting movement of the bell crank when the lever arm is depressed, and means on the dial adapted to disengage the clutching means to release the clutch arm whereby the shaft may be driven by the meter.

29. In liquid dispensing apparatus having flow establishing means, a meter, and liquid delivery means, in combination, indicating means, automatic means to return the indicating means to initial position, a shaft, operative connections between the indicating means and shaft, operative connections between the shaft and the meter comprising clutch mechanism, a support for the liquid delivery means, first means adapted to be retained by the liquid delivery means when on the support, means to move said first means when the liquid delivery means is removed from the support, operative connections between the first means and the clutch to release the shaft from the meter and permit the automatic means to return the indicating means to initial position, means maintaining the operation of the flow establishing means adapted to be rendered inoperative when the liquid delivery means is on the support, means normally inoperative enabling the operation of the flow establishing means, said enabling means being rendered operative by the return of the indicating means to initial position.

30. In liquid dispensing apparatus having flow establishing means, a meter, and liquid delivery means, in combination, indicating means, automatic means to return the indicating means to initial position, a shaft, operative connections between the indicating means and shaft, operative connections between the shaft and the meter comprising clutch mechanism, a support for the liquid delivery means, first means adapted to be retained by the liquid delivery means when on the support, means to move said first means when the liquid delivery means is removed from the support, operative connections between the first means and the clutch to release the shaft from the meter and permit the automatic means to return the indicating means to initial position, means maintaining the operation of the flow establishing means, second means adapted to be retained by the liquid delivery means when on the support, means to move the second means when the delivery means is removed from the support, operative connections between the second means and the maintaining means, means to enable the operation of the flow establishing means, and means associated with the indicating means to render said enabling means operative upon return of the indicating means to initial position.

31. In liquid dispensing apparatus having flow establishing means, a meter, and liquid delivery means, in combination, a rotatable indicator, automatic means to return the indicator to initial position, a shaft, operative connections between the shaft and the meter comprising clutch mechanism, a support for the liquid delivery means, first means adapted to be retained by the liquid delivery means when on the support, means to move said first means when the liquid delivery means is removed from the support, operative connections between the first means and the clutch to release the shaft from the meter and permit the automatic means to return the indicator to initial position, means maintaining the operation of the flow establishing means, second means adapted to be retained by the liquid delivery means when on the support, operative connections between the second means and the maintaining means, means enabling the operation of the flow establishing means, said last named means being rendered operative by the return of the indicator to initial position.

32. In liquid dispensing apparatus having flow establishing means, a meter, and liquid delivery means, in combination, indicating means, automatic means to return the indicating means to initial position, a shaft, operative connections between the indicating means and shaft, operative connections between the shaft and the meter comprising clutch mechanism, a support for the liquid delivery means, a first lever arm adapted to be depressed by the liquid delivery means when on the support, means to move said first lever arm when the liquid delivery means is removed from the support, a second lever arm adapted to move with the first lever arm, operative connections between the second lever arm and the clutch to release the shaft from the meter and permit the automatic means to return the indicating means to initial position, means maintaining the operation of the flow establishing means, a third lever arm adapted to be depressed when the liquid delivery means is on the support, a fourth lever arm movable with the third lever arm, operative connections between the fourth lever arm and the maintaining means, means to enable the operation of the flow establishing means, and means associated with the indicating means to actuate the enabling means upon return of the indicating means to initial position.

33. In liquid dispensing apparatus having flow establishing means, a meter, and liquid delivery means, in combination, indicating means, automatic means to return the indicating means to initial position, a shaft, operative connections between the indicating means and the shaft, operative connections between the shaft and the meter, a support for the liquid delivery means, means to render said last named connections inoperative to permit the indicating means to be returned to initial position, and means to terminate the operation of the flow establishing means upon return of the liquid delivery means to its support.

34. In liquid dispensing apparatus having flow establishing means, a meter, and liquid delivery means, in combination, indicating means, means to return the indicating means to initial position, operative connections between the indicating means and the meter, a support for the liquid delivery means, means to render said connections inoperative upon removal of the delivery means from its support to permit the indicating means to return to initial position, means maintaining the operation of the flow establishing means, said means being rendered effective by the removal of the liquid delivery means from its support, means enabling the operation of the flow establishing means rendered effective by the return to initial position of the indicating means, said maintaining means being rendered ineffective by the return of the liquid delivery means to the support to terminate the operation of the flow establishing means.

35. In liquid dispensing apparatus having a liquid elevating means, a motor actuating the same, a meter, and liquid delivery means, in combination, a rotatable indicator, means to return the indicator to zero position, a shaft, operative connections between the indicator and the shaft, operative connections between the shaft and the meter comprising clutch mechanism, a clutch actuating lever, a support for the liquid delivery means, an arm adapted to be depressed by the liquid delivery means when on the support, a second arm movable therewith, means to move said second arm to actuate the clutch lever to release the shaft from the meter and permit the indicator to return to initial position, a latching means to engage the clutch lever when in clutch releasing position, means movable with the indicator to actuate the latching means to release the clutch lever, means to initiate the operation of the motor, means movable with the indicator to operate said last named means when the indicator reaches initial position and a lever adapted to be depressed by the liquid delivery means when on the support to terminate the operation of the motor.

36. In liquid dispensing apparatus having flow establishing means and liquid metering means, in combination, indicating means movable by the liquid metering means from an initial position in proportion to the amount of liquid passed through the metering means, means to return the indicating means to initial position and means controlled by the indicating means when at initial position to initiate the operation of the flow establishing means.

37. In liquid dispensing apparatus having flow establishing means and liquid metering means, in combination, indicating means, means to return the indicating means to initial position, means normally preventing the operation of the flow establishing means and means released by the indicating means at initial position to initiate the operation of the flow establishing means.

38. In liquid dispensing apparatus having a pump and a meter, in combination, indicating means, means to return the indicating means to zero position, and means controlled by the indicating means when it reaches zero position to start the pump automatically.

39. In liquid dispensing apparatus having flow establishing means and liquid metering means, in combination, indicating means movable by the liquid metering means from an initial position in proportion to the amount of liquid passed through the metering means, means to return the indicating means to initial position, and means to prevent the operation of the flow establishing means until the indicating means reaches initial position.

40. In liquid dispensing apparatus having liquid flow establishing means, liquid metering means, liquid delivery means and a support therefor, in combination, indicating means, means to return the indicating means to initial position upon removal of the delivery means from the support and means to prevent the operation of the flow establishing means until the indicating means is at initial position.

41. In liquid dispensing apparatus having liquid flow establishing means, liquid metering means, liquid delivery means and a support therefor, in combination, indicating means, means to return the indicating means to initial position upon removal of the delivery means from the support and means to initiate the operation of the flow establishing means by the indicating means.

42. In liquid dispensing apparatus, in combination, flow establishing means, liquid delivery means, means operating for a predetermined time interval to initiate the operation of the flow establishing means at the expiration of the said time interval, and means controlled by the liquid delivery means to initiate the operation of the first named initiating means.

43. In liquid dispensing apparatus, in combination, flow establishing means, liquid delivery means, means operating for a predetermined time interval to initiate the operation of the flow establishing means at the expiration of said time interval, and means controlled by the position of the liquid delivery means to initiate the operation of the first named initiating means.

44. In liquid dispensing apparatus, in combination, flow establishing means, liquid delivery means, a support therefor, means operating for a predetermined time interval to initiate the operation of the flow establishing means at the expiration of said time interval, and means to initiate the operation of the first named means upon removal of the liquid delivery means from its support.

45. In a fluid delivery device, in combination, flow establishing means, indicating means, releasable means to initiate the actuation of the flow establishing means, means to hold said releasable means in inoperative position and means to cause said last named means to release said releasable means upon return of the indicating means to initial position.

46. In a fluid delivery device, in combination, flow establishing means, fluid metering means, indicating means, means to return said indicating means to initial position comprising releasable means, and means to effect the operation of the flow establishing means only after the indicating means has returned to initial position.

47. In a fluid delivery device, in combination, flow establishing means, fluid metering means, indicating means, power storing means to return said indicating means to initial position, releasable means to permit said power storing means to return the indicating means to initial position and means to effect the operation of the flow establishing means only after the indicating means has returned to initial position.

48. In liquid dispensing apparatus, in combination, a pump, an electrical motor driving the pump, an electrical circuit comprising the motor and a switch, liquid metering means, a rotatable member whereof the movement away from zero position is proportional to the amount of liquid passed through the metering means, a pin carried by the rotatable member and movable therewith, a lever actuated by said pin when the rotating member is at initial position, means to close the switch and controlling connections between said lever and said switch closing means.

49. In liquid dispensing apparatus, in combination, a pump, an electrical motor driving the pump, an electrical circuit comprising the motor and a switch, liquid metering means, a rotatable member whereof the movement away from zero position is proportional to the amount of liquid passed through the metering means, a pin carried by the rotatable member and movable therewith, a lever actuated by said pin when the rotating member is at initial position, means to actuate the switch and controlling connections between said lever and said switch actuating means comprising power storing means.

50. In liquid dispensing apparatus, in combination, liquid flow establishing means, electrical motor means actuating said flow establishing means, an electrical circuit comprising the motor means and a switch, liquid metering means having a shaft the movement of which is proportional to the amount of liquid passed through the metering means, a rotatable member whereof the movement away from an initial position is proportional to the amount of liquid passing through the metering means, clutch means between the shaft and the rotatable member permitting said member to be returned to initial position, a pin carried by said rotatable member, a lever actuated by said pin when the rotating member is at initial position, means to actuate said switch and controlling connections between said lever and said switch actuating means.

51. In liquid dispensing apparatus, in combination, liquid flow establishing means, electrical motor means actuating said flow establishing means, an electrical circuit comprising the motor means and a switch, liquid metering means having a shaft the movement of which is proportional to the amount of liquid passed through the metering means, cam means whereof the movement away from an initial position is proportional to the amount of liquid passing through the metering means, clutch means between the shaft and the cam means permitting said cam means to be returned to initial position, means to return said cam means to initial position, a lever actuated by said cam means when said cam means is at initial position, means to actuate said switch and controlling connections between said lever and said switch actuating means.

52. In liquid dispensing apparatus, in combination, liquid flow establishing means, electrical motor means actuating said flow establishing means, an electrical circuit comprising the motor means and a switch, liquid metering means having a shaft the movement of which is proportional to the amount of liquid passed through the metering means, a rotatable member whereof the movement away from an initial position is proportional to the amount of liquid passing through the metering means, clutch means between the shaft and the rotatable member permitting said member to be returned to initial position, manually controlled means to return said rotating member to initial position, a pin carried by said rotatable member, a lever actuated by said pin when the rotating member is at initial position, means to actuate said switch and controlling connections between said lever and said switch actuating means.

53. In liquid dispensing apparatus having flow establishing means, an electric circuit comprising a motor and a switch and liquid metering means, in combination, a member rotatable away from an initial position the movement of which is proportional to the quantity of liquid metered, a pin carried by the rotatable member, a clutch releasing said rotatable member from the metering means for return to initial position and means actuated by the pin when at initial position to initiate the closing of the switch.

54. In liquid dispensing apparatus, in combination, a pump, an electrical motor driving the pump, an electrical circuit comprising the motor and at least one switch, liquid metering means, rotatable cam means the movement of which away from initial position is proportionate to the amount of liquid passing through the metering means, manually controlled means to return the cam means to initial position, a lever operatively connected with a switch in the motor circuit and movable between extreme positions in one of which the switch is open and in the other of which the switch is closed, power storing means moving the lever to one extreme position and means effecting the closing of the switch upon return of the cam means to initial position.

55. In liquid dispensing apparatus, in combination, liquid flow establishing means, liquid metering means, liquid delivery means, a support therefor, indicating means movable away from an initial position in proportion to the amount of liquid passed through the metering means, power storing means to return the indicating means to initial position, operative connections between said metering means and the indicating means comprising clutch means, clutch releasing means movable between an operative and an inoperative position, said clutch releasing means being retained in inoperative position by the delivery means when on the support and means actuated by the indicating means when at initial position to initiate the operation of the flow establishing means.

56. A liquid dispensing apparatus comprising a meter through which the liquid passes, said meter having a shaft the movement of which is proportional to the amount of liquid passed through the meter, indicating means, operative connections between the indicating means and said shaft, means tending to return the indicating means to initial position, means for disconnecting the indicating means from the shaft, and means for maintaining said disconnection until the indicating means has returned to initial position.

57. A liquid dispensing apparatus comprising a meter through which the liquid passes, said meter having a shaft the movement of which is proportional to the amount of liquid passed through the meter, a dial connected to said shaft, means tending to return the dial to zero position, means for disconnecting the dial from the shaft, and means for maintaining said disconnection until the dial has returned to zero.

58. A liquid dispensing apparatus comprising liquid elevating means, a meter through which the liquid passes, said meter having a shaft the movement of which is proportional to the amount of liquid passed through the meter, indicating means, operative connections between the indicating means and the shaft, means tending to return the indicating means to initial position, means for disconnecting the indicating means from the shaft and initiating the operation of the liquid elevating means, and means for maintaining said disconnection until the indicating means has returned to initial position.

59. A liquid dispensing apparatus comprising liquid elevating means, a meter through which the liquid passes, said meter having a shaft the movement of which is proportional to the amount of liquid passed through the meter, indicating means, operative connections between the indicating means and the shaft, means tending to return the indicating means to initial position, means for disconnecting the indicating means from the shaft, means to initiate the operation of the liquid elevating means and means for maintaining said disconnection until the indicating means has returned to initial position.

60. A liquid dispensing apparatus comprising liquid elevating means, a meter through which the liquid passes, said meter having a shaft the movement of which is proportional to the amount of liquid passed through the meter, indicating means, operative connections between the indicating means and the shaft, means tending to return the indicating means to initial position, means for disconnecting the indicating means from the shaft, means to initiate the operation of the liquid elevating means, means for maintaining said disconnection until the indicating means has returned to initial position and means to halt the operation of the liquid elevating means.

61. In liquid dispensing apparatus, in combination, flow establishing means, electrical operating means therefor comprising a circuit and a switch, liquid metering means, a shaft rotated by the metering means away from an initial position in proportion to the liquid passed through the metering means, means to return said shaft to initial position, a lever, operative connections between the lever and said switch, means to retain said lever in switch open position and means carried by said shaft adapted, at initial position thereof, to render ineffective said retaining means.

62. In liquid dispensing apparatus having a meter, liquid delivery means and a support therefor, in combination, indicating means, power means to rotate the indicating means in one direction, a shaft, operative connections between the indicating means and the shaft, operative connections between the meter and shaft comprising clutch mechanism, means controlled by the position of the liquid delivery means on the support to actuate the clutch to release the shaft from the meter and permit the power means to return the indicating means to zero position.

63. In liquid dispensing apparatus having liquid flow establishing means, a meter, and liquid delivery means, in combination, indicating means, means to return the indicating means to initial position, operative connections between the indicating means and the meter, means to render said connections inoperative to permit the indicating means to return to initial position, means maintaining the operation of the liquid flow establishing means, means enabling the operation of the liquid flow establishing means, said enabling means being rendered effective by the return to initial position of the indicating means, said maintaining means being rendered ineffective to terminate the operation of the liquid elevating means.

64. In liquid delivery apparatus, the combination of a meter having mechanism for re-setting the meter to zero position, means for delivering liquid through the meter, actuating means for starting and stopping the delivery means; and means interconnecting the re-setting mechanism and the actuating means to insure the meter being at zero position when the delivery means is started.

65. In liquid delivery apparatus, the combination of a meter having mechanism for resetting the same to zero position, means for effecting the liquid flow through the meter, electric switch mechanism controlling operation of said liquid flow effecting means and interconnecting means between said switch mechanism and meter resetting mechanism for insuring return of the meter to zero position before operation of the switch for starting flow by said liquid flow effecting means.

66. In a fluid dispensing device, the combination with a meter having a resettable indicator, of means for forcing fluid through the meter in order to actuate the indicator, operable means for controlling the flow of fluid through the meter and an operative connection for resetting the indicator to a desired position when the operable means is actuated to start the flow of fluid through the meter, said connection permitting the indicator to remain in the position indicating the fluid dispensed after the operable means is actuated to discontinue the flow of fluid through the meter.

67. In a liquid delivery apparatus, the combination of a meter having associated resetting mechanism, a delivery hose connected to said meter, controllable means to deliver fluid through the meter and hose, operating means for said resetting mechanism, a support for the hose when not in use and actuating means, normally inoperative while the hose is on the support, for actuating the operating means and the controllable means after the hose has been removed from its support, said actuating means being arranged to operate the resetting mechanism before any fluid is dispensed from the hose.

68. Liquid delivery apparatus, comprising in combination a delivery line terminating in a delivery hose, a pump in the delivery line, a meter in the delivery line, said meter being provided with resetting mechanism a support for the free end of the hose, a controller for the pump, actuating means for said controller disposed to oppose return of the hose to the support but movable out of said opposing relation to actuate the controller and operating connections from said controller actuating means for actuating the meter resetting mechanism.

69. In liquid delivery apparatus, the combination of a meter having resetting mechanism, a controller for regulating flow through the meter, actuating means for said controller and operating connections from said actuating means to said meter resetting mechanism.

70. In a fluid dispensing apparatus, the combination of power means for delivering fluid therefrom, indicating means for determining the quantities of fluid delivered, and means for controlling said power means, whereby said power means is initially operable only when said indicating means is in a predetermined position.

71. In a fluid dispensing apparatus, the combination of power means for delivering fluid, indicating means for determining the quantity of fluid dispensed by said apparatus, control means for said power means, and cam means associated with said indicating means for rendering said control means operable for initial operation of said power means only when said indicating means is in a predetermined position.

72. In combination, power means, indicating means, means for initiating operation of said power means, and means cooperating with said indicating and initiating means and for controlling said initiating means whereby the same is initially operable only when said indicating means is in its zero reading position.

73. In an apparatus of the class described, a delivery conduit terminating with a flexible hose having on its delivery end a nozzle, a meter interposed in said conduit having a register with a movable element driven by the meter to indicate the quantities of liquid forced therethrough, means for forcing liquid through said conduit comprising a switch, meter, hose and nozzle; a control member movable from one position to another to close and open said switch, a fixed support for said nozzle when not in use interrelated with said member to compel the latter to be moved into position to open said switch before the nozzle can be placed on said support, and means operable during the movement of the control member toward its position to close said switch to reset said element of the register.

74. In a liquid dispensing apparatus, in combination, a delivery hose, liquid flow establishing means comprising a first control means and a second control means, indicating means movable away from zero position in proportion to the quantity of liquid flowing through the apparatus, cyclically operating zeroizing means which at the end of its operation has restored the indicating means to zero position and means movable during the movement of the zeroizing means to move to operative position the first control means, and movable means to render the second control means operative, said movable means being actuated by the indicating means in its movement to zero position, said movable means being inoperative to control the flow establishing means when the indicating means is moving away from zero position in recording the flow of liquid through the apparatus.

75. In a liquid dispensing system, in combination, a delivery hose having a nozzle, flow establishing means comprising a first control means and a second control means, indicating means movable away from zero position in proportion to the flow of liquid established by the flow establishing means, cyclically operating zeroizing means to restore the indicating means to zero position, said zeroizing means in one phase of the cycle rendering operative the first control means, and means controlled by the nozzle when on its support comprising a movable member, said movable member actuating the second control means.

76. In a liquid dispensing system, in combination, a delivery hose having a nozzle, flow establishing means comprising a first control means and a second control means, indicating means movable away from zero position in proportion to the flow of liquid established by the flow establishing means, cyclically operating zeroizing means to restore the indicating means to zero position, said cyclic movement being completed and said restoration to zero being completed substantially simultaneously, said zeroizing means in one phase of the cycle rendering operative the first control means, and means controlled by the nozzle when on its support comprising a movable member, said movable member actuating the second control means.

77. In a liquid dispensing system, in combination, a delivery hose, a pump, an electric motor for driving the pump, a switch through which the motor may be energized, a liquid meter for measuring the liquid dispensed, a resettable indicator driven by said meter having a predetermined initial position, means for preventing the resetting of the indicator when the switch is closed and a device moved with said indicator to control said preventing means.

78. In a liquid dispensing system, in combination, a delivery hose, a pump, an electric motor for driving the pump, a switch through which the motor may be energized, a liquid meter for measuring the liquid dispensed, a resettable indicator driven by said meter having a predetermined initial position, means for preventing the resetting of the indicator when the switch is closed, a device moved with said indicator to control said preventing means and means for opposing closing of said switch.

79. In a liquid dispensing system, in combination, a delivery hose having a nozzle, flow establishing means comprising control means and a control switch, indicating means movable away from zero position in proportion to the flow of liquid established by the flow establishing means, cyclically operating zeroizing means to restore the indicating means to zero position, said zeroizing means during one portion of its movement in the cycle rendering operative the control means, means controlled by the nozzle when on its support comprising a movable member, a rockable member having an arm, and means interconnecting the movable member and the rockable member, the arm of said rockable member when the nozzle is placed on the support rendering said control means inoperative.

80. In liquid dispensing apparatus, in combination, a delivery hose having a nozzle, a member movable between two positions, in one of which positions said member is controlled by the nozzle in supported relation, a meter, a resettable indicator to indicate the quantity of liquid flowing through the meter, operative connections between the meter and the indicator, fluid flow establishing means comprising a switch closed by the movable member when the nozzle is removed from supported relation, cyclically operating zeroizing means to reset the indicator and means to render said operative connections inoperative when the zeroizing means is resetting the indicator.

81. In liquid dispensing apparatus, in combination, flow establishing means, liquid delivery means, means operating cyclically to initiate the operation of the flow establishing means at the end of the said cyclic operation, and means controlled by the liquid delivery means to initiate the operation of the cyclically operating means.

82. In liquid delivery apparatus, the combination of a meter having mechanism for resetting the meter to zero position, means for delivering liquid through the meter, actuating means for starting and stopping the delivery means, said resetting means and actuating means being interconnected to prevent operation of the actuating means after completion of a liquid delivery until the resetting means has been actuated.

83. In liquid delivery apparatus, the combination with a meter, of a counter, means including a normally-engaged clutch for driving the counter, liquid-forcing means for delivering liquid to the meter, control means to control operation of the liquid-forcing means, and means cooperatively associated with the control means for disengaging the clutch.

84. Liquid dispensing apparatus including a meter and counting mechanism driven by the meter, clutch means in the operative connection between the meter and the counting mechanism, control means for the clutch, a pump, a motor for operating the pump for forcing the liquid through a meter and instrumentalities providing an interlock between the control means of the clutch and the motor.

85. In a liquid dispensing device, the combination with liquid-forcing means, of a meter adapted to be actuated by the flow of liquid from said liquid-forcing means, a counter for said meter, resetting mechanism for the counter comprising spring means normally urging the counter toward zero position, means adapted to actuate the resetting means, and means including a clutch for driving the counter from the displacement meter against the urge of the spring means.

86. In a liquid dispensing device, the combination with liquid-forcing means, of a meter adapted to be actuated by the flow of liquid from said liquid-forcing means, a counter for said meter, resetting mechanism for the counter comprising spring means normally urging the counter toward zero position, means adapted to actuate the resetting means, and means including a clutch for driving the counter from the meter against the urge of the spring means, and means to release the clutch to permit the spring to reset the counter.

87. In a liquid dispensing device, the combination with liquid-forcing means, of a meter adapted to be actuated by the flow of liquid from said liquid-forcing means, a counter for said meter, resetting mechanism for the counter comprising spring means normally urging the counter toward zero position, means adapted to actuate the resetting means, and means including a clutch for driving the counter from the meter against the urge of the spring means, means to engage the clutch including instrumentalities cooperatively associated with the liquid-forcing means so that the clutch may be engaged prior to actuating of the liquid-forcing means.

88. In a liquid delivery apparatus, the combination of a meter, of mechanism for resetting the meter, means for delivering liquid through the meter, actuating means for starting and stopping the delivery means, manually actuated means for operating the resetting mechanism, and means interconnecting the manually actuated means and the control means for the liquid delivery to ensure the meter being at zero position when the delivery means is started.

89. In a liquid dispensing device, the combination with a pump having a manually operable control for starting and stopping the flow of fluid therethrough, a meter having mechanism operated by the flow of fluid from the pump, manually operable resetting means for the meter, and means interconnecting the resetting means and the pump control whereby to prevent a pump-starting movement of the pump control until the manual actuation of the resetting means.

90. In a liquid delivery apparatus, the combination of a meter having resetting mechanism, a pump, manually actuated means to start and stop the pump, a manual actuator for the resetting mechanism, and means connecting the resetting mechanism and the pump actuator to prevent starting movement of the pump actuator until actuation of the resetting means.

91. In a liquid dispensing apparatus, in combination, liquid metering means, means to establish liquid flow through the metering means, indicating means movable by the metering means from an initial position in proportion to the amount of liquid passed through the metering means, means to halt the operation of said liquid flow establishing means, means to retain the indicator at that position recording the amount delivered and means to prevent the recording of flow of liquid after the operation of the flow establishing means has halted until the indicator has been restored to initial position.

92. In liquid dispensing apparatus, in combination, liquid metering means, means to establish liquid flow through the metering means, indicating means movable by the metering means from an initial position in proportion to the amount of liquid passed through the metering means, means to restore the indicating means to initial position, and means released by the indicating means when at initial position to initiate the operation of the flow establishing means.

93. In liquid dispensing apparatus, in combination, liquid metering means, means to establish liquid flow through the metering means, indicating means movable by the metering means from an initial position in proportion to the amount of liquid passed through the metering means, means to restore the indicating means to zero position, and means released by the restoring means when at initial position to initiate the operation of the flow establishing means.

94. In liquid dispensing apparatus, in combination, a pump, an electrical motor driving the pump, an electrical circuit comprising the motor and a switch, liquid metering means, indicating means driven by the metering means, the movement of which away from an initial position is proportional to the amount of liquid passed through the metering means, means to restore said indicating means to initial position comprising a rotatable member, a switch closing member movable between at least two positions, means to control said switch closing member controlled by the rotatable member, comprising automatic means to actuate said control means the operation of which is initiated by said rotatable member.

95. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; set-back mechanism for restoring said indicating mechanism to zero position; and means operatively connecting said set-back mechanism with said switch, whereby said switch is held open, with the pump idle, after each dispensing operation until the indicating mechanism is set back to zero position.

96. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; a lever for controlling the operation of said switch; a set-back mechanism for restoring said indicating mechanism to zero position; and means operatively connecting said set-back mechanism with said switch controlling lever, whereby said switch is held open, with the pump idle, after each dispensing operation until the indicating mechanism is set back to zero position.

97. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; set-back mechanism for restoring said indicating mechanism to zero position; and means operatively connecting said set-back mechanism with said switch, including a cam, lever and spring, whereby said switch is held open, with the pump idle, after each dispensing operation until the indicating mechanism is set back to zero position.

98. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; set-back mechanism for restoring said indicating mechanism to zero position; and means operatively connecting said set-back mechanism with said switch, including a lever and a spring; whereby said switch is held open, with the pump idle, after each dispensing operation until the indicating mechanism is set back to zero position.

99. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; a lever for controlling the operation of said switch; a set-back mechanism for restoring said indicating mechanism to zero position; and means operatively connecting said set-back mechanism with said switch controlling lever, including a lever and a spring in cooperative relation with said controlling lever; whereby said switch is held open, with the pump idle, after each dispensing operation until the indicating mechanism is set back to zero position.

100. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; a lever for controlling the operation of said switch; a set-back mechanism for restoring said indicating mechanism to zero position; means including a cam operatively connecting said set-back mechanism with said lever; means operatively connected with said cam for positively stopping said set-back mechanism when said indicating mechanism is restored to zero position; and means operatively connecting said set-back mechanism with said switch; whereby said switch is held open, with the pump idle, after each dispensing operation until the indicating mechanism is set back to zero position.

101. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; means for controlling the operation of said switch; set-back mechanism for restoring said indicating mechanism to zero position; means including a cam operatively connecting said set-back mechanism with said controlling means; said means cooperating with said cam for positively stopping said set-back mechanism when said indicating mechanism is restored to zero position and means operatively connecting said set-back mechanism with said switch; whereby said switch is held open; with the pump idle, after each dispensing operation until the indicating mechanism is set back to zero position.

102. In an apparatus of the class described a delivery conduit terminating with a flexible hose having on its delivery end a nozzle, a meter interposed in said conduit having a register with a movable element driven by the meter to indicate the quantities of liquid forced therethrough, means for forcing liquid through said conduit, meter, hose and nozzle; control means movable from one position to another to start and stop said forcing means, a fixed support for said nozzle when not in use mounted adjacent but in non-interfering relation with said control means, said control means except when positioned to stop said forcing means interfering with the placing of the nozzle on its support, said nozzle when in place on said support projecting therebeyond into the path of movement of said control means and preventing movement of the same, and means operable during the movement of said control means from the position in which said forcing means is stopped to the position in which said forcing means is started to reset said element of the register.

103. In an apparatus of the class described, a delivery conduit terminating with a flexible hose having on its delivery end a nozzle, a meter interposed in said conduit having a register with a movable element driven by the meter to indicate the quantities of liquid forced therethrough, means for forcing liquid through said conduit, meter, hose and nozzle; control means movable from one position to another to start and stop said forcing means, a fixed support for said nozzle when not in use mounted adjacent but in non-interfering relation with said control means, said control means except when positioned to stop said forcing means interfering with the placing of the nozzle on its support, said nozzle when in place on said support projecting therebeyond into the path of movement of said control means and preventing movement of the same, and transmission means between said control means and said element for turning the element backward when said control means is moved in the direction necessary to start said forcing means.

104. In an apparatus of the class described, a delivery conduit terminating with a flexible hose having on its delivery end a nozzle, a meter interposed in said conduit having a register with a movable element driven by the meter to indicate the quantities of liquid forced therethrough, means for forcing liquid through said conduit, meter, hose and nozzle; control means movable from one position to another to start and stop said forcing means, a fixed support for said nozzle when not in use mounted adjacent but in non-interfering relation with said control means, said control means except when positioned to stop said forcing means interfering with the placing of the nozzle on its support, said nozzle when in place on said support projecting therebeyond into the path of movement of said control means and preventing movement of the same, transmission means between said control means and said element for turning the element backward when said control means is moved in the direction necessary to start said forcing means, cooperating clutch elements in said transmission, and shifting means actuated by movement of said control means to disengage the clutch elements just prior to the starting of said forcing means.

105. In an apparatus of the class described, a delivery conduit terminating with a flexible hose having on its delivery end a nozzle, a meter interposed in said conduit having a register with a movable element driven by the meter to indicate the quantities of liquid forced therethrough, means for forcing liquid through said conduit, meter, hose and nozzle; a support for said nozzle, control means movable back and forth throughout a predetermined range in a path adjacent but in non-interfering relation with said support, said control means except at one end of its range of movement interfering with the placing of said nozzle on its support, said nozzle when in place on said support projecting beyond the support into the path of movement of said control means to prevent movement of the latter, means actuated by said control means when moved into said end of its range of movement for stopping said forcing means and when moved into the other end of said range for starting said forcing means, and means operable by movement of said control means from the first named to the second named end of its range of movement to reset said element.

106. In apparatus of the class described, a liquid delivery conduit, a meter interposed in said conduit, means for forcing liquid through said conduit and meter, a register having a movable element to indicate the quantity of liquid measured by said meter, driving means between said meter and element including a connection enabling resetting of said element without operation of the meter, control means manually movable back and forth through a predetermined range, a transmission between said control means and driving means, whereby movement of said control means in one direction will reset said element, a device to start and stop said forcing means actuated by said control means at the end of its movement in said direction to start said forcing means and at the end of its movement in the other direction to stop said forcing means, means actuated by said control means at the end of its movement in the last named direction to stop said forcing means and to prevent energizing said forcing means until the resetting means has reset the movable element.

107. In apparatus of the class described, a liquid delivery conduit terminating with a flexible hose having a nozzle on the delivery end thereof, a meter interposed in said conduit, means for forcing liquid through said conduit and meter, hose and nozzle; a register having a movable element to indicate the quantity of liquid measured by said meter, driving means between said meter and element including a connection enabling resetting of said element without operation of the meter, control means manually movable through a predetermined range, a transmission between said control means and driving means, a device to start and stop said forcing means actuated by said control means at the end of its movement in said direction to start said forcing means and at the end of its movement in the other direction to stop said forcing means, means actuated by said control means at the end of its movement in the last named direction to stop said forcing means and to prevent reenergizing said forcing means until said control means is moved in the first named direction and the movable element has been reset, and a support for said nozzle, said control means mounted to move adjacent said support and to interfere with the placing of the nozzle thereon in all positions of said control means except at that end of its range of movement in which the forcing means is stopped.

108. In an apparatus of the class described, a delivery conduit terminating with a flexible hose having on its delivery end a nozzle, a meter interposed in said conduit having a register with a movable element driven by the meter to indicate the quantities of liquid forced therethrough, means for forcing liquid through said conduit, meter, hose and nozzle; a device to start and stop said forcing means, control means movable from one position to another to actuate said device and start and stop said forcing means, a fixed support for said nozzle when not in use mounted adjacent but in non-interfering relation with said control means, said control means except when in position to stop said forcing means interfering with the placing of the nozzle on its support, said nozzle when in place on said support projecting therebeyond into the path of movement of said control means and preventing movement of the same, transmission means between said control means and said element for turning the element backward when said control means is moved in the direction necessary to start said forcing means, cooperating clutch elements in said transmission and shifting means actuated by movement of said control means to disengage the clutch elements just prior to the starting of said forcing means.

109. In liquid dispensing apparatus, the combination of a source of supply, a pump the suction side of which is connected to said source, a meter having the inlet side connected to the discharge side of said pump, a motor for operating said pump, a switch operating said motor, discharge means connected to the outlet side of said pump, registering means operated by said meter for registering the amount dispensed, a reset shaft connected to said register for resetting said register to zero position, means associated with said switch and said reset shaft for preventing restarting said motor until said register is reset to zero, said preventing means including a switch arm connected to said switch, and means controlled by said reset shaft and cooperating with said switch arm for preventing movement of said switch arm for restarting operation of said motor until said resetting shaft has been moved to reset said register to zero.

110. In liquid dispensing apparatus, the combination of a source of supply, a pump the suction side of which is connected to said source, a meter having the inlet side connected to the discharge side of said pump, a motor for operating said pump, a switch for operating said motor, discharge means connected to the outlet side of said pump, registering means operated by said meter for registering the amount dispensed, a reset shaft connected to said register for resetting said register to zero position, means associated with said switch and said reset shaft for preventing restarting said motor until said register is reset to zero, said preventing means including a switch arm connected to said switch, means having cooperative engagement with said switch arm, a connection between said reset shaft and said cooperative engagement means whereby said cooperative engagement means is moved to permit operation of said switch arm when said register is in predetermined position, and cooperating means on said switch arm for rendering said switch arm inoperative after said switch arm has been moved from operative position.

111. Liquid dispensing apparatus comprising liquid supply means, indicating devices to register the quantity of liquid dispensed by the apparatus, means to maintain said indicating devices in indicating position after a dispensing operation, and means to reset said indicating devices to zero simultaneously with starting the apparatus in a succeeding dispensing operation.

112. In a liquid dispensing apparatus having a motor driven pump, indicating devices to register the quantity dispensed, and means to maintain said devices in indicating position when the motor is de-energized, and to reset said devices to zero during the action of again starting the motor pump, said resetting action being accomplished by the movement of the motor starting switch.

113. In a liquid dispensing apparatus of the kind described, a motor adapted to be electrically driven, a pump actuated by said motor, measuring means and indicating means to measure and to indicate the quantity dispensed, mechanism associated with said indicating means to reset the same to zero, and an electrical switch to initiate operation of the motor and connections therefor to actuate the resetting mechanism.

114. In liquid delivery apparatus, the combination of a meter having associated resetting mechanism, control means for controlling the flow through the meter, actuating means for said control means, and means connecting said actuating means with the resetting mechanism whereby the actuating means and the resetting mechanism may operate synchronously.

115. Liquid delivery apparatus comprising in combination, a delivery line terminating in a hose having a nozzle, a fluid forcing means operably connected to said line, a meter in the delivery line, said meter having an associated resetting mechanism, means providing a support for the hose nozzle, control means for controlling the liquid forcing means, mechanism for actuating said control means adapted to be disposed in a position preventing return of the nozzle to its support when the pump is in operation, said nozzle, when supported on the hook, being adapted to prevent actuation of said control means and thus render the liquid forcing means inoperative, and operating connections from said control means for actuating the meter resetting means.

116. In a fluid dispensing device, the combination of a fluid delivery line, fluid forcing means associated with said line, control means selectively conditionable to start and stop the fluid forcing means, flow responsive apparatus associated with the line, an indicator actuated by the flow responsive apparatus, resetting mechanism for the indicator, and an operative connection between the resetting mechanism and the control means whereby to reset the indicator when the fluid forcing means is started in operation.

117. In a fluid dispensing device, the combination of a fluid delivery line terminating in a dispensing hose, a hook for the free end of the hose, fluid forcing means associated with said line, control means selectively conditionable to start and stop the fluid forcing means, flow responsive apparatus associated with the line, an indicator actuated by the flow responsive apparatus, resetting mechanism for the indicator, and an operative connection between the resetting mechanism and the control means whereby to reset the indicator when the fluid forcing means is started in operation, said control means having a portion movable to a position obstructing the placement of the end of the hose on the hook when the fluid forcing means is in operation, said portion being shiftable to a position permitting the end of the hose to be hung on the support, said fluid forcing means being inoperable when the portion is in shifted position.

118. In a fluid dispensing device, the combination of a fluid delivery line terminating in a dispensing hose, a hook for the free end of the hose, fluid forcing means associated with said line, control means selectively conditionable to start and stop the fluid forcing means, flow responsive apparatus associated with the line, an indicator actuated by the flow responsive apparatus, resetting mechanism for the indicator, and an operative connection between the resetting mechanism and the control means whereby to reset the indicator before the fluid forcing means is started in operation, said control means having a portion movable to a position obstructing the placement of the end of the hose on the hook, said portion being shiftable when the fluid forcing means is in operation to a position permitting the end of the hose to be hung on the support, said fluid forcing means being inoperable when the portion is in shifted position.

119. In a liquid delivery apparatus, the combination of a meter having turnable indicating means including a drive shaft, means for passing liquid through said meter to operate said drive shaft, and resetting mechanism for said indicating means including a toothed member on said shaft, a rack adapted to engage said toothed member, means for controlling the flow of liquid through the meter, and actuating means for said control means and connections from said actuating means to said rack for operating the resetting means.

120. In a fluid dispensing device, the combination of a meter having a resettable indicator, controllable means to cause the flow of fluid through the meter, and means to set the indicator to a predetermined setting when the controllable means is actuated, said means cooperating with the controllable means to prevent the restarting of fluid flow through the meter, after stopping, until the indicator is reset.

121. In a fluid dispensing device, in combination, a meter having a resettable indicator adapted to be actuated in response to fluid flowing through the meter and means to reset the indicator and control the fluid flow in a desired sequence, said means preventing restarting of fluid flow through the meter, after stopping, until the indicator is reset.

122. In a fluid dispensing device, in combination, a meter having a resettable indicator adapted to be actuated in response to fluid flowing through the meter, and control means operable to start and stop the flow of fluid through the meter, and means operatively associated with the control means to permit the indicator to remain in position indicating the amount dispensed after the fluid flow has stopped and to reset the indicator automatically as and when the flow is again started by the control means.

123. In a fluid dispensing device, in combination, a meter having a resettable indicator adapted to be actuated in response to fluid flowing through the meter and control means to start and stop the flow of fluid through the meter and means operatively associated with the control means to reset the indicator after the fluid flow has stopped, said means preventing the re-establishment of fluid flow through the meter after the control means has been actuated to stop the flow until the indicator has been reset.

124. In a liquid delivery apparatus, the combination of a meter having associated resetting mechanism, a delivery hose connected to said meter, means to cause a flow of fluid to be dispensed through said meter and hose, a support for the hose when not in use and operating means for said resetting mechanism, said operating means being rendered inoperative while the hose is on its support.

125. In a liquid delivery apparatus, the combination of a meter having associated resetting mechanism, a delivery hose connected to said meter, fluid forcing means to deliver fluid to said meter and hose, control means for controlling the delivery of fluid through said hose, a support for the hose when not in use, and operating means for said resetting mechanism, said operating means and said control means being rendered inoperative while the hose is on its support.

126. A liquid dispensing system including a pump and driving means therefor and control means for energizing and de-energizing said driving means, a liquid meter for measuring the liquid dispensed, an indicator driven by said meter and means having marked thereon an initial position for said indicator, means for resetting said indicator into the initial position, means for preventing the resetting of the indicator and a device operated by the movement of said control means for displacing the said preventing means.

127. In a fluid dispensing apparatus, the combination of power means for delivering fluid therefrom, indicating means for determining the quantities of fluid delivered, and means associated with said indicating means for controlling said power means, whereby said power means is initially operable only when said indicating means is in a predetermined position.

128. In a fluid dispensing apparatus, the combination of an electric motor including an electric circuit, means in said circuit for controlling said circuit and operation of said motor for delivering fluid, indicating means for determining quantities of fluid delivered by said apparatus, and means for controlling said circuit control means whereby said motor is initially operable only when said indicating means is in a predetermined position.

129. In a fluid dispensing apparatus, the combination of an electric motor including an electric circuit, means in said circuit for controlling said circuit and operation of said motor for delivering fluid, indicating means for determining quantities of fluid delivered by said apparatus, and means associated with said indicating means for controlling said circuit control means whereby said motor is initially operable only when said indicating means is in a predetermined position.

130. In a fluid dispensing apparatus, the combination of power means including an electric motor for delivering fluid, said means including a circuit and a manually operable switch for controlling said circuit indicating means for determining quantities of fluid dispensed by said apparatus, and means associated with said indicating means for limiting the operation of said switch whereby said circuit is initially completed for operation of said power means only when said indicating means is in a predetermined position.

131. In a fluid dispensing apparatus, the combination of power means including an electric motor for delivering fluid, said means including a circuit and a manually operable switch for controlling said circuit, indicating means for determining quantities of fluid dispensed by said apparatus, and means carried by said indicating means for rendering said switch initially operable only when said indicating means is in a predetermined position.

132. In a fluid dispensing apparatus or the like, the combination of means for discharging quantities of fluid, indicating means operable in accordance with the fluid discharged for determining the quantities of fluid delivered from said apparatus, means for initiating discharge of said fluid, and means for controlling said last-named means whereby the same is initially operable only when said indicating means is in a predetermined position.

133. In a fluid dispensing apparatus or the like, the combination of means for discharging quantities of fluid, said means including a nozzle, indicating means operable for determining the quantities of fluid delivered through said nozzle, means for initiating discharge of said fluid including movable means associated with said nozzle when in its normal inoperative position, and means controlling said initiating means whereby the same is initially operable only when said indicating means is in a predetermined position.

134. In a fluid dispensing apparatus or the like, the combination of means for discharging quantities of fluid, said means including a switch controlled motor for pumping said fluid and a nozzle, indicating means operable for determining the quantities of fluid delivered through said nozzle, means for initiating discharge of said fluid including movable means associated with said nozzle when in its normal inoperative position for operating said switch, and means controlling said initiating means whereby the same is initially operable only when said indicating means is in a predetermined position.

135. In a fluid dispensing apparatus or the like, the combination of means for discharging quantities of fluid, said means including a fluid meter, indicating means operable in accordance with said meter for determining the quantities of fluid discharged from said apparatus, means for initiating discharge of said fluid, and means for controlling said last-mentioned means whereby the same is initially operable only when said indicating means is in a predetermined position.

136. In a fluid dispensing apparatus or the like, the combination of means for discharging quantities of fluid, said means including a switch controlled motor, a fluid meter, indicating means operable in accordance with said meter for determining the quantities of fluid discharged from said apparatus, means for operating said switch to initiate discharge of fluid, and means for controlling said last-mentioned means whereby the same is initially operable only when said indicating means is in a predetermined position.

137. A liquid dispensing system including a pump and driving means therefor, a liquid meter for measuring the dispensed liquid, an indicator driven by said meter and having a predetermined initial position, and means for preventing the energization of said driving means when said indicator is in other than initial postion.

138. A liquid dispensing system including a pump and an electric motor for driving the same, a switch through which the motor may be energized, a liquid meter for measuring the liquid dispensed, a resettable indicator driven by said meter and having a predetermined initial position, and means operated by the departure of the indicator from initial position to prevent the closing of the switch.

139. A liquid dispensing system including a pump and an electric motor for driving the same, a switch through which the motor may be energized, a liquid meter for measuring the liquid dispensed, a resettable indicator driven by said meter having a predetermined initial position, a device moved with the switch, and means operated by the departure of said indicator from initial position for preventing the movement of said device and switch into closed position until the indicator has been reset into initial position.

140. In fluid dispensing apparatus having fluid flow establishing means, fluid metering means, in combination, indicating means, operative connections between the indicating means and the metering means comprising clutch means and a clutch operating lever, releasable means to move the clutch lever, said releasable means being released by the return of the indicating means to zero position.

141. In fluid dispensing apparatus having fluid flow establishing means, a meter and fluid delivery means, in combination, indicating means, operative connections between the indicating means and the meter comprising clutch means, clutch releasing means, means to move said clutch releasing means, and retaining means for the last named means in operative position.

142. In a fluid dispensing apparatus, in combination, a dispensing hose, means to establish a flow of liquid to the hose comprising a pump and a meter measuring the quantities of liquid flowing to the hose, an indicator driven by the meter and visually indicating the quantities of liquid flowing to the hose and means for controlling the flow establishing means whereby the flow establishing means is initially operable only when said indicating means is in a predetermined position.

143. In a fluid dispensing apparatus, in combination a dispensing hose, means to establish a flow of liquid to the hose comprising a pump and a meter measuring the quantities of liquid flowing to the hose, an indicator driven by the meter and visually indicating the quantities of liquid flowing to the hose by a series of numerals in arithmetical progression including an initial position representing the commencement of the delivery of liquid to the hose, and means for controlling the flow establishing means whereby the flow establishing means is initially operable only when said indicating means visually indicates said initial position.

144. In a liquid dispensing system, in combination, a delivery hose having a nozzle, a support therefor, flow establishing means comprising a first control means and a second control means, indicating means movable away from zero position in proportion to the flow of liquid established by the flow establishing means, movable zeroizing means to restore the indicating means to zero position, said zeroizing means during its movement actuating the first control means, and means controlled by the nozzle when on its support comprising a movable member, said movable member actuating the second control means.

145. In a liquid dispensing system, in combination, a delivery hose having a nozzle, flow establishing means comprising a meter with indicating means movable away from zero position in proportion to the flow of liquid established by the flow establishing means, power storing means to restore the indicating means to zero position, said power storing means being actuated to store power therein by said flow establishing means, and means controlled by the nozzle when on its support to prevent the operation of said power storing means.

146. In a liquid dispensing system, in combination, a delivery hose having a nozzle, a support therefor, flow establishing means comprising control means and metering means, indicating means movable away from zero position in proportion to the flow of liquid established by the flow establishing means through the delivery hose, means controlled by the nozzle when on its support to actuate the control means, power storing means to restore the indicating means to zero position, operating connections between said power storing means and said flow establishing means to store power in said power storing means during the operation of said flow establishing means in one transaction, and means actuated upon removal of the nozzle from its support to release the power storing means to restore the indicating means to zero position.

147. In a liquid dispensing system, in combination, a delivery hose having a nozzle, a support therefor, flow establishing means comprising a pump, an electric motor driving the pump and a meter through which liquid is pumped, a switch in the pump motor circuit, an indicator driven by the meter away from zero position in proportion to the amount of liquid passed through the meter, power storing means, operative connections between the power storing means and the indicator to restore the indicator to zero position, operative connections between the power storing means and the flow establishing means to store power in the power storing means during the dispensing of liquid in one transaction, means rendering said power storing means inoperative until a subsequent transaction and means actuated upon removal of the nozzle from the support to release said power to restore the indicator to zero position.

148. In liquid dispensing apparatus, in combination, a flow establishing means comprising a pump, a motor driving the pump and a meter through which the liquid is pumped, an indicator driven by the meter and movable away from an initial position in proportion to the amount of liquid passed through the meter, power storing means to restore the indicator to its initial position, means to store power in said power storing means, said means being actuated by the flow establishing means during the operation of the pump in dispensing liquid and means to release said power storing means to restore the indicator to initial position.

149. In liquid dispensing apparatus, in combination, flow establishing means comprising a pump, a motor driving the pump and a meter through which the liquid is pumped, an indicator driven by the meter and movable away from an initial position in proportion to the amount of liquid passed through the meter, a nozzle, a nozzle support, movable means released for movement by the removal of the nozzle from its support, power storing means to restore the indicator to its initial position, means to store power in said power storing means, said means being actuated by the flow establishing means during the operation of the pump in dispensing liquid and means actuatable upon removal of the nozzle from its support to release said power storing means to restore the indicator to initial position.

150. In liquid dispensing apparatus, in combination, flow establishing means comprising a pump, a motor driving the pump and a meter through which the liquid is pumped, a switch controlling the motor, means to close the switch an indicator driven by the meter and movable away from an initial position in proportion to the amount of liquid passed through the meter, power storing means to restore the indicator to its initial position, means to store power in said power storing means, said means being actuated by the flow establishing means during the operation of the pump in dispensing liquid and means actuated by said switch closing means to release said power storing means to restore the indicator to initial position.

151. In fluid dispensing apparatus having fluid flow establishing means, in combination, indicating means, means to return the indicating means to initial position, and means to initiate the operation of the flow establishing means when the returning means reaches initial position.

152. In fluid dispensing apparatus having fluid flow establishing means, fluid delivery means and a support therefor, in combination, indicating means, means to return the indicating means to initial position upon removal of the delivery means from the support and means to initiate the operation of the flow establishing means when the returning means reaches initial position.

153. In fluid dispensing apparatus having fluid flow establishing means, fluid delivery means and a support therefor, in combination, indicating means, means to return the indicating means to initial position upon removal of the delivery means from the support, and automatic means to initiate the operation of the flow establishing means when the returning means reaches initial position.

154. In fluid dispensing apparatus having fluid flow establishing means, in combination, indicating means, means to return the indicating means to initial position, said returning means being adapted to initiate the operation of the fluid establishing means.

155. In fluid dispensing apparatus having fluid flow establishing means, in combination, indicating means, means to return the indicating means to initial position, said returning means being adapted to initiate the operation of the flow establishing means when the indicating means reaches initial position.

156. In fluid dispensing apparatus having fluid flow establishing means, fluid delivery means and a support therefor, in combination, indicating means, means to return the indicating means to initial position upon removal of the delivery means from the support, said returning means being adapted to initiate the operation of the flow establishing means when said indicating means reaches initial position.

157. In fluid dispensing apparatus having fluid flow establishing means, a meter and fluid delivery means, in combination, indicating means, operative connections between the indicating means and the meter comprising clutch means, clutch releasing means, means to move said clutch releasing means, retaining means for the last named means and positive means to cause the disengagement of the clutch releasing means.

158. In fluid dispensing apparatus having fluid flow establishing means, a meter and fluid delivery means, in combination, indicating means, a meter shaft, operative connections between the meter shaft and the indicating means comprising clutch mechanism, a clutch actuating lever, rocking means adapted to be rocked in one direction by the fluid delivery means and having means to engage the clutch actuating lever to move the same to disengage the clutch and release the indicating means.

159. In fluid dispensing apparatus, having fluid flow establishing means, in combination, indicating means, means to return the indicating means to initial position and means to initiate the actuation of the fluid means upon return of the returning means to initial position.

160. In fluid dispensing apparatus having fluid flow establishing means, fluid metering means, in combination, indicating means, operative connections between the indicating means and the metering means comprising a shaft, a clutch element freely rotatable on the shaft, operative connections between the clutch element and the metering means, an arm fixed on the shaft, a movable clutch element carried by the arm and adapted to cooperate with the first named clutch element, means to selectively move said movable element and a counterweight to balance said arm.

161. A liquid dispensing apparatus, comprising means for establishing a flow of liquid, an indicator responsive to said flow displaying progressive indicia indicating the quantities dispensed in a given operation, instrumentalities for restoring said indicator to an initial position displaying the initial indicia and for preventing the display of progressive indicia in a succeeding operation until the initial indicia have been so displayed, and means cooperatively associated with the flow establishing means and the indicator to effect operation of the flow establishing means as the indicator is restored to display the initial indicia.

162. A liquid dispensing apparatus comprising means for establishing a flow of liquid, an indicator responsive to said flow displaying progressive indicia indicating the quantities dispensed in a given operation, instrumentalities for restoring said indicator to an initial position displaying the initial indicia and for preventing the display of progressive indicia in a succeeding operation until the initial indicia have been so displayed, and means cooperatively associated with the flow establishing means and the indicator to effect restoration of said indicator and actuation of said flow establishing means.

163. A liquid dispensing apparatus comprising means for establishing a flow of liquid, an indicator responsive to said flow displaying progressive indicia indicating the quantities dispensed in a given operation, instrumentalities for restoring said indicator to an initial position displaying the initial indicia and for preventing the display of progressive indicia in a succeeding operation until the initial indicia have been so displayed, and means cooperatively associated with the flow establishing means and the indicator to effect concomitant correlative change in said indicator and flow establishing means.

164. A liquid dispensing apparatus comprising means for establishing a flow of liquid, means controlling the flow, an indicator responsive to said flow displaying progressive indicia indicating the quantities dispensed in a given operation, instrumentalities for restoring said indicator to an initial position displaying the initial indicia and for preventing the display of progressive indicia in a succeeding operation until the initial indicia have been displayed, and means cooperatively associated with the controlling means and the indicator to insure related actuation of said controlling means and restoring of said indicator.

165. In a liquid dispensing apparatus, in combination, liquid flow establishing means comprising fluid forcing means, metering means, indicating means driven by the metering means in proportion to the quantity of liquid flowing through the meter means, and control means for the flow establishing means, means to restore the indicating means to zero position, means movable during the movement of the zeroizing means to move to operative position the control means, said movable means being actuated with the indicating means in its movement to zero position, said movable means being inoperative to control the flow establishing means when the indicating means is moving away from zero position in recording the flow of liquid through the apparatus.

166. A liquid dispensing apparatus comprising means for establishing a flow of liquid, means controlling the flow, an indicator responsive to said flow displaying progressive indicia indicating the quantities dispensed in a given operation, and instrumentalities for restoring said indicator to an initial position displaying the zero indicia and for preventing the display of progressive indicia in a succeeding operation until the zero indicia have been displayed.

167. In a liquid dispensing apparatus, in combination, liquid flow establishing means comprising fluid forcing means, metering means, indicating means driven by the metering means in proportion to the quantity of liquid flowing through the meter means, and control means to prevent operation of the flow establishing means, means to restore the indicating means to zero position, means movable by the restoring means to move to operative position the control means, said movable means being inoperative to control the flow establishing means when the indicating means is moving away from zero position in recording the flow of liquid through the apparatus.

168. In a fluid dispensing apparatus, in combination, a dispensing hose, means to establish a flow of liquid to the hose comprising a pump and a meter measuring the quantities of liquid flowing to the hose, an indicator driven by the meter and visually indicating the quantities of liquid flowing to the hose and means for controlling the flow establishing means whereby the flow establishing means is initially operable only when said indicating means visually indicates a predetermined indication.

169. In liquid dispensing apparatus having flow establishing means and liquid metering means, in combination, indicating means, means to return the indicating means to initial position, means normally preventng the operation of the flow establishing means and means released by the indicating means at initial position to permit the operation of the flow establishing means.

170. In liquid dispensing apparatus having a pump and a meter, in combination, indicating means, means to return the indicating means to zero position and means controlled by the indicating means in the zeroizing movement to start the pump.

WILLIAM H. LOLLEY.
HARRY T. GOSS.

CERTIFICATE OF CORRECTION

Patent No. 2,084,288. June 15, 1937.

WILLIAM H. LOLLEY, ET AL.

It is hereby certified that error appears in the printed specification of the above numbered patent requiring correction as follows: Page 5, second commn, line 59, for the words "the initiating the closing of the circuit by closing" read the closing of the circuit by initiating the closing of; page 9, second column, line 6, claim 24, for "means, driven means in one direction" read means in one direction, driven means; page 22, second column, line 33, claim 169, for "preventng" read preventing; and that the said Letters Patent should be read with these corrections therein that the same may conform to the record of the case in the Patent Office.

Signed and sealed this 24th day of August, A. D. 1937.

Leslie Frazer
Acting Commissioner of Patents.

(Seal)